US011265066B2

(12) United States Patent
Zhou et al.

(10) Patent No.: US 11,265,066 B2
(45) Date of Patent: Mar. 1, 2022

(54) ANTENNA PANEL CAPABILITY DETERMINATION AND INDICATION IN WIRELESS COMMUNICATIONS

(71) Applicant: QUALCOMM Incorporated, San Diego, CA (US)

(72) Inventors: Yan Zhou, San Diego, CA (US); Tao Luo, San Diego, CA (US); Kiran Venugopal, Raritan, NJ (US); Tianyang Bai, Bridgewater, NJ (US); Jung Ho Ryu, Fort Lee, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/790,580

(22) Filed: Feb. 13, 2020

(65) Prior Publication Data

US 2020/0266875 A1    Aug. 20, 2020

Related U.S. Application Data

(60) Provisional application No. 62/806,690, filed on Feb. 15, 2019.

(51) Int. Cl.
*H04B 7/08* (2006.01)
*H04B 7/06* (2006.01)
(Continued)

(52) U.S. Cl.
CPC .......... *H04B 7/086* (2013.01); *H04B 7/0404* (2013.01); *H04B 7/0408* (2013.01);
(Continued)

(58) Field of Classification Search
CPC ...... H04B 7/04; H04B 7/0404; H04B 7/0408; H04B 7/0413; H04B 7/0617;
(Continued)

(56) References Cited

U.S. PATENT DOCUMENTS

| 2012/0113844 | A1* | 5/2012 | Krishnamurthy | ..... H04W 24/02 370/252 |
| 2015/0244432 | A1* | 8/2015 | Wang | ................... H04B 7/0695 375/267 |

(Continued)

OTHER PUBLICATIONS

International Search Report and Written Opinion—PCT/US2020/018370—ISA/EPO—dated Apr. 16, 2020.

*Primary Examiner* — Young T. Tse
(74) *Attorney, Agent, or Firm* — Qualcomm Incorporated

(57) ABSTRACT

Methods, systems, and devices for wireless communications provide for identification of multiple antenna panels at a user equipment (UE), and determination of panel-specific capabilities for the multiple antenna panels. A UE may determine whether simultaneous communications using two or more antenna panels is supported. The UE may determine that simultaneous communications using two or more antenna panels is supported based on a predetermined rule that indicates such simultaneous communications are supported or unsupported. Whether simultaneous communications on multiple panels is supported may be dependent upon a capability of the UE. The UE may transmit panel-specific capabilities to the base station, that may be used by the base station for subsequent communications between the UE and the base station.

30 Claims, 19 Drawing Sheets

(51) Int. Cl.
    *H04B 7/0404*      (2017.01)
    *H04B 7/0413*      (2017.01)
    *H04W 8/24*      (2009.01)
    *H04B 7/0408*      (2017.01)
    *H04W 72/04*      (2009.01)

(52) U.S. Cl.
    CPC ......... *H04B 7/0413* (2013.01); *H04B 7/0617* (2013.01); *H04B 7/0628* (2013.01); *H04B 7/0695* (2013.01); *H04W 8/24* (2013.01); *H04W 72/046* (2013.01)

(58) Field of Classification Search
    CPC .. H04B 7/0628; H04B 7/0686; H04B 7/0695; H04B 7/0802; H04B 7/086; H04B 7/0865; H04B 7/0874; H04B 7/088; H04B 7/0897; H04W 8/24; H04W 72/02; H04W 72/046
    USPC ........ 375/259, 260, 262, 265, 267; 370/328, 370/329, 334; 455/456.5, 456.6, 500, 517
    See application file for complete search history.

(56) References Cited

U.S. PATENT DOCUMENTS

| | | | |
|---|---|---|---|
| 2018/0062257 A1* | 3/2018 | Kausar | H01Q 19/32 |
| 2018/0227094 A1 | 8/2018 | Liu et al. | |
| 2018/0367205 A1 | 12/2018 | Liu et al. | |
| 2019/0037604 A1* | 1/2019 | Akkarakaran | H04W 74/004 |
| 2019/0053321 A1* | 2/2019 | Islam | H04B 7/0639 |
| 2019/0081682 A1* | 3/2019 | Wu | H04L 5/0048 |
| 2020/0067615 A1 | 2/2020 | Ghanbarinejad et al. | |
| 2020/0220592 A1 | 7/2020 | Ryu et al. | |
| 2020/0227826 A1 | 7/2020 | Washakowski et al. | |
| 2020/0267536 A1 | 8/2020 | Zhou | |
| 2021/0112561 A1 | 4/2021 | Zhou et al. | |
| 2021/0195546 A1 | 6/2021 | Lei et al. | |
| 2021/0211957 A1 | 7/2021 | Kamohara et al. | |

\* cited by examiner

ANTENNA PANEL CAPABILITY DETERMINATION AND INDICATION IN WIRELESS COMMUNICATIONS

CROSS REFERENCE

The present Application for patent claims the benefit of U.S. Provisional Patent Application No. 62/806,690 by ZHOU et al., entitled "ANTENNA PANEL CAPABILITY DETERMINATION AND INDICATION IN WIRELESS COMMUNICATIONS," filed Feb. 15, 2019, assigned to the assignee hereof, and expressly incorporated by reference herein.

BACKGROUND

The present disclosure relates to wireless communications, and more specifically to antenna panel capability determination and indication in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, wireless devices (e.g., base stations, UEs, etc.) may use beamformed or precoded signals for transmission and/or reception of wireless communications. For example, a base station may utilize beamformed or precoded transmissions to provide directional transmissions that may mitigate path losses that may be experienced by non-beamformed or non-precoded transmissions which may have a relatively wide beam or omnidirectional transmission pattern. In some cases, a base station and/or a UE may use two or more antenna panels to transmit beams. In some cases different antenna panels at a UE may be associated with different beams that provide communications between the UE and a base station. Efficient techniques for managing beams from multiple antenna panels may help enhance reliability and efficiency of a network utilizing beamforming.

SUMMARY

The described techniques relate to improved methods, systems, devices, and apparatuses that support antenna panel capability determination and indication in wireless communications. Various described techniques provide for identification of multiple antenna panels at a user equipment (UE), and determination of panel-specific capabilities for the multiple antenna panels. In some cases, the UE may determine whether simultaneous communications using two or more antenna panels is supported. In some cases, the UE may determine that simultaneous communications using two or more antenna panels is supported based on a predetermined rule that indicates such simultaneous communications are supported or unsupported. In some cases, whether simultaneous communications on multiple panels is supported is dependent upon a capability of the UE. The UE may transmit panel-specific capabilities to the base station, that may be used by the base station for subsequent communications between the UE and the base station.

In some cases, each of the multiple antenna panels has an associated set of beams that can be supported at the antenna panel, where different beams associated with a same antenna panel cannot support simultaneous communications. In some cases, a panel identification (ID) or virtual panel ID may be associated with a set of beams that correspond to a number of different reference signal resources, different reference signal resource ports, different reference signal resource sets, different spatial relations (e.g., different beamforming directions), different spatial filters, or any combinations thereof. In some cases the reference signals may include one or more of a sounding reference signal (SRS), a channel state information reference signal (CSI-RS), a demodulation reference signal (DMRS), or any combinations thereof. In some cases, the panel-specific capabilities may indicate one or more of a capability to support simultaneous communications using multiple beams on multiple panels, a number of spatial layers or ranks per beam or panel, a maximum number of spatial layers or ranks supported across all beams or panels, supported combinations of spatial layers or ranks across beams or panels that support simultaneous communications, or any combinations thereof.

A method of wireless communication at a UE is described. The method may include identifying a first set of beams associated with a first antenna panel and a second set of beams associated with a second antenna panel, each beam of the first set of beams and the second set of beams having different beamforming characteristics for communications with a base station, determining that simultaneous communications via a first beam of the first set of beams and a second beam of the second set of beams is supported by the UE, determining a maximum number of supported spatial layers for each of the first beam and the second beam based at least in part on determining that simultaneous communications via the first beam and the second beam is supported, transmitting, to the base station, a first indication that simultaneous communications via the first beam and the second beam is supported and a second indication of the maximum number of supported spatial layers for each of the first beam and the second beam, and communicating with the base station using at least one of the first beam or the second beam based on the transmitting the first indication and the second indication.

An apparatus for wireless communication at a UE is described. The apparatus may include a processor, memory in electronic communication with the processor, and instructions stored in the memory. The instructions may be executable by the processor to cause the apparatus to identify a first set of beams associated with a first antenna panel and a second set of beams associated with a second antenna panel, each beam of the first set of beams and the second set of beams having different beamforming characteristics for communications with a base station, determine that simultaneous communications via a first beam of the first set of beams and a second beam of the second set of beams is supported by the UE, determine a maximum number of supported spatial layers for each of the first beam and the second beam based at least in part on determining that simultaneous communications via the first beam and the second beam is supported, transmit, to the base station, a first indication that simultaneous communications via the first beam and the second beam is supported and a second indication of the maximum number of supported spatial layers for each of the first beam and the second beam, and communicate with the base station using at least one of the first beam or the second beam based on the transmitting the first indication and the second indication.

Another apparatus for wireless communication at a UE is described. The apparatus may include means for identifying a first set of beams associated with a first antenna panel and a second set of beams associated with a second antenna panel, each beam of the first set of beams and the second set of beams having different beamforming characteristics for communications with a base station, determining that simultaneous communications via a first beam of the first set of beams and a second beam of the second set of beams is supported by the UE, determining a maximum number of supported spatial layers for the first beam and the second beam based at least in part on determining that simultaneous communications via the first beam and the second beam is supported, transmitting, to the base station, a first indication that simultaneous communications via the first beam and the second beam is supported and a second indication of the maximum number of supported spatial layers for each of the first beam and the second beam, and communicating with the base station using at least one of the first beam or the second beam based on the transmitting the first indication and the second indication.

A non-transitory computer-readable medium storing code for wireless communication at a UE is described. The code may include instructions executable by a processor to identify a first set of beams associated with a first antenna panel and a second set of beams associated with a second antenna panel, each beam of the first set of beams and the second set of beams having different beamforming characteristics for communications with a base station, determine that simultaneous communications via a first beam of the first set of beams and a second beam of the second set of beams is supported by the UE, determine a maximum number of supported spatial layers for each of the first beam and the second beam based at least in part on determining that simultaneous communications via the first beam and the second beam is supported, transmit, to the base station, a first indication that simultaneous communications via the first beam and the second beam is supported and a second indication of the maximum number of supported spatial layers for each of the first beam and the second beam, and communicate with the base station using at least one of the first beam or the second beam based on the transmitting the first indication and the second indication.

In some examples of the method, apparatuses, and non-transitory computer-readable medium described herein, the determining may include operations, features, means, or instructions for determining that simultaneous communications using beams associated with different antenna panels are supported or unsupported based on one or more of a hardware configuration of the UE, a predetermined rule for communications via multiple antenna panels, a configuration provided by the base station, or any combinations thereof. Some examples of the method, apparatuses, and non-transitory computer-readable medium described herein may further include operations, features, means, or instructions for determining that the hardware configuration of the UE supports simultaneous communications via multiple antenna panels, and transmitting, the base station, an indication that simultaneous communications using beams associated with different antenna panels is supported by the UE. Some examples of the method, apparatuses, and non-transitory computer-readable medium described herein may further include operations, features, means, or instructions for receiving configuration information from the base station that enables simultaneous communications via multiple antenna panels, and initiating a beam training procedure to determine beamforming parameters for the first beam and the second beam.

Some examples of the method, apparatuses, and non-transitory computer-readable medium described herein may further include operations, features, means, or instructions for transmitting, to the base station, a first subset of the first set of beams and a second subset of the second set of beams that can be used for simultaneous communications. Some examples of the method, apparatuses, and non-transitory computer-readable medium described herein may further include operations, features, means, or instructions for transmitting, to the base station, an indication of the first set of beams and the second set of beams, where any beam of the first set of beams and any beam of the second set of beams can be selected for simultaneous communications.

Some examples of the method, apparatuses, and non-transitory computer-readable medium described herein may further include operations, features, means, or instructions for determining that the hardware configuration of the UE does not support simultaneous communications via multiple antenna panels, and transmitting, to the base station, an indication that simultaneous communication using beams associated with different antenna panels may be unsupported by the UE. In some examples of the method, apparatuses, and non-transitory computer-readable medium described herein multiple beams of the first set of beams cannot be used for simultaneous communications, and multiple beams of the second set of beams cannot be used for simultaneous communications.

In some examples of the method, apparatuses, and non-transitory computer-readable medium described herein, the first set of beams and the second set of beams correspond to different reference signal resources, different reference signal ports, different reference signal resource sets, different spatial resources, different spatial filters, or any combinations thereof. In some examples of the method, apparatuses, and non-transitory computer-readable medium described herein, the reference signal resources, the reference signal ports, and the reference signal resource sets, may be each associated with an SRS, a CSI-RS, a DMRS, or any combinations thereof.

Some examples of the method, apparatuses, and non-transitory computer-readable medium described herein may further include operations, features, means, or instructions for determining a maximum number of supported spatial layers for each of the first beam and the second beam based on a fixed maximum number or a hardware capability of the UE. In some examples of the method, apparatuses, and non-transitory computer-readable medium described herein, the first set of beams and the second set of beams may be analog millimeter-wave beams. In some examples of the method, apparatuses, and non-transitory computer-readable medium described herein, each antenna panel at the UE may be associated with a panel ID.

In some examples of the method, apparatuses, and non-transitory computer-readable medium described herein, each panel ID may be associated with a virtual antenna panel having two or more antenna elements that may be co-located on a same antenna module or may be located on different antenna modules. In some examples of the method, apparatuses, and non-transitory computer-readable medium described herein, the first indication and the second indication are a same indication.

A method of wireless communication at a base station is described. The method may include identifying a UE that is to establish communications with the base station using one or more of a first set of beams associated with a first antenna panel and a second set of beams associated with a second antenna panel, each beam of the first set of beams and the second set of beams having different beamforming characteristics for communications with the UE, determining whether simultaneous communications via a first beam of the first set of beams and a second beam of the second set of beams is supported, and communicating with the UE using at least one of the first beam or the second beam based on the determining.

An apparatus for wireless communication at a base station is described. The apparatus may include a processor, memory in electronic communication with the processor, and instructions stored in the memory. The instructions may be executable by the processor to cause the apparatus to identify a UE that is to establish communications with the base station using one or more of a first set of beams associated with a first antenna panel and a second set of beams associated with a second antenna panel, each beam of the first set of beams and the second set of beams having different beamforming characteristics for communications with the UE, determine whether simultaneous communications via a first beam of the first set of beams and a second beam of the second set of beams is supported, and communicate with the UE using at least one of the first beam or the second beam based on the determining.

Another apparatus for wireless communication at a base station is described. The apparatus may include means for identifying a UE that is to establish communications with the base station using one or more of a first set of beams associated with a first antenna panel and a second set of beams associated with a second antenna panel, each beam of the first set of beams and the second set of beams having different beamforming characteristics for communications with the UE, determining whether simultaneous communications via a first beam of the first set of beams and a second beam of the second set of beams is supported, and communicating with the UE using at least one of the first beam or the second beam based on the determining.

A non-transitory computer-readable medium storing code for wireless communication at a base station is described. The code may include instructions executable by a processor to identify a UE that is to establish communications with the base station using one or more of a first set of beams associated with a first antenna panel and a second set of beams associated with a second antenna panel, each beam of the first set of beams and the second set of beams having different beamforming characteristics for communications with the UE, determine whether simultaneous communications via a first beam of the first set of beams and a second beam of the second set of beams is supported, and communicate with the UE using at least one of the first beam or the second beam based on the determining.

In some examples of the method, apparatuses, and non-transitory computer-readable medium described herein, the determining may include operations, features, means, or instructions for determining that simultaneous communications using beams associated with different antenna panels is supported or unsupported based on one or more of a hardware configuration of the UE, a predetermined rule for communications via multiple antenna panels, whether the base station may have enabled simultaneous communications using beams associated with different antenna panels, or any combinations thereof. Some examples of the method, apparatuses, and non-transitory computer-readable medium described herein may further include operations, features, means, or instructions for receiving an indication from the UE that the UE supports simultaneous communications via multiple antenna panels.

Some examples of the method, apparatuses, and non-transitory computer-readable medium described herein may further include operations, features, means, or instructions for receiving, from the UE, an indication of a maximum number of supported spatial layers for each of the first beam and the second beam based on a fixed maximum number or a hardware capability of the UE.

DETAILED DESCRIPTION

Figure 1:
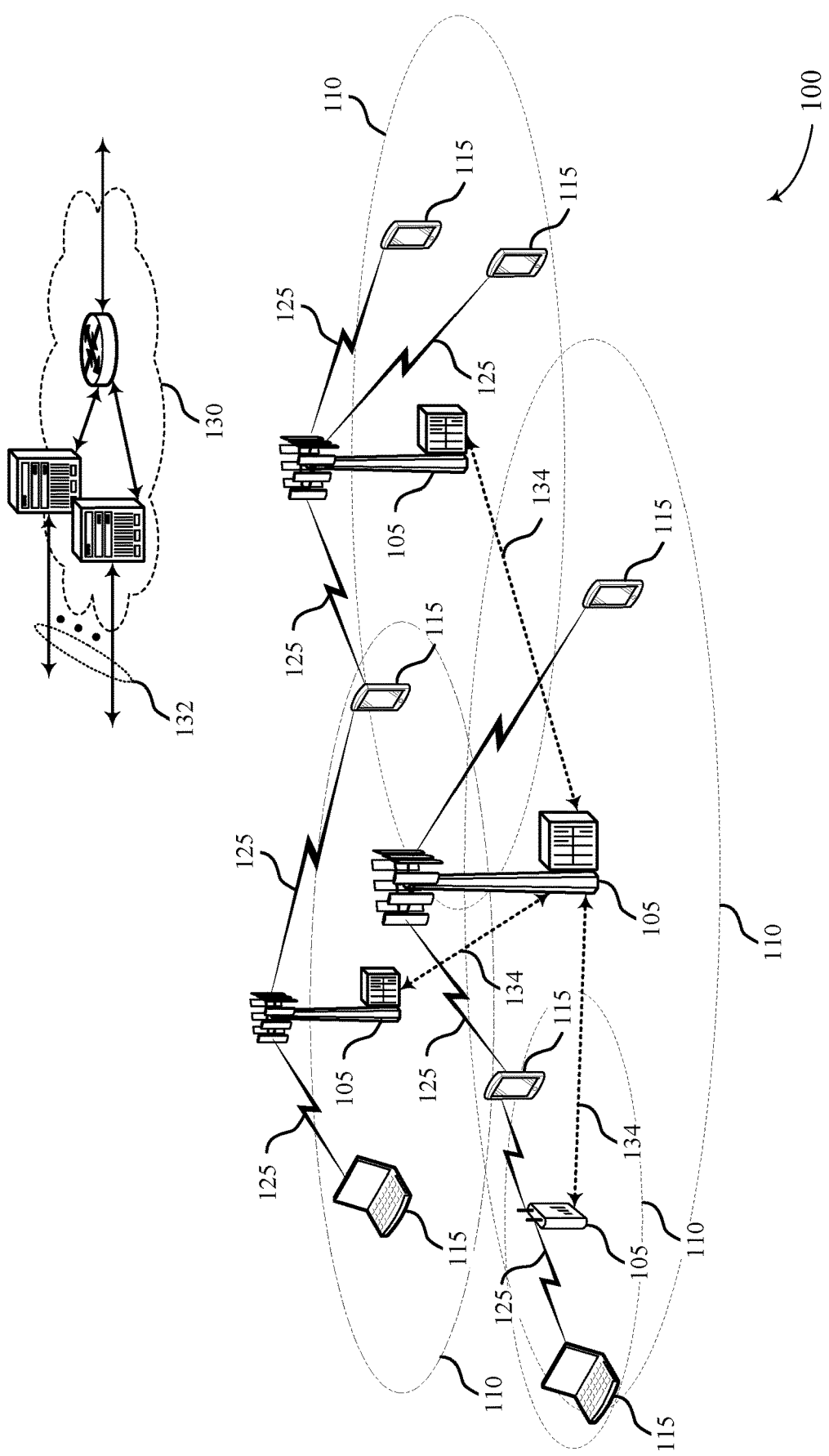
FIG. 1 illustrates an example of a system for wireless communications that supports antenna panel capability determination and indication in wireless communications in accordance with aspects of the present disclosure.

Various aspects of the present disclosure relate to methods, systems, devices, and apparatuses that support antenna panel capability determination and indication in wireless communications. In some aspects, techniques are provided for identification of multiple antenna panels at a user equipment (UE), and determination of panel-specific capabilities for the multiple antenna panels. In some cases, a UE may have multiple antenna elements configured as one or more antenna arrays or sub-arrays that may be located in one or more antenna modules. A group of antenna elements, which may include two or more antenna elements in one or more antenna arrays or sub-arrays may be referred to herein as an antenna panel, which may correspond to a physical antenna panel or hardware module at a UE or to a virtual antenna panel that may include two or more antenna elements that are a subset of antenna elements at a physical antenna module or that span multiple antenna modules.

In some cases, the multiple antenna panels of a UE may each be suitable for communications using certain transmission beams. For example, a first antenna panel may be configured such that a first set of beams in a first direction may be transmitted or received using the associated antenna elements, and a second antenna panel may be configured such that a second set of beams in a second direction may be transmitted or received using the associated antenna elements. In some cases, antenna panels may be identified based on the associated set of beams that may be supported using antenna elements of the antenna panel. A UE may thus identify multiple antenna panels according to the sets of beams that may be transmitted or received. In some cases, a UE may be capable of concurrently transmitting or receiving beams using two or more antenna panels. In other cases, a UE may support only beams at a single antenna panel at a time. Such UE capability may depend upon a number of different factors, such as hardware configurations of the UE, processing capabilities of the UE, available power at the UE, or any combinations thereof. Various aspects of the present disclosure provide techniques for identification of UE antenna panels and panel-specific capabilities, and for providing an indication of panels and panel-specific capabilities to a base station or other wireless communications device that the UE may communicate with.

In some cases, the UE may determine whether simultaneous communications using two or more antenna panels is supported. In some cases, the UE may determine that simultaneous communications using two or more antenna panels is supported based on a predetermined rule that indicates such simultaneous communications are supported or unsupported. In some cases, whether simultaneous communications on multiple panels is supported is dependent upon a capability of the UE. In some cases, the UE may transmit panel-specific capabilities to the base station, that may be used by the base station for subsequent communications between the UE and the base station.

In some cases, each of the multiple antenna panels has an associated set of beams that can be supported at the antenna panel, where different beams associated with a same antenna panel cannot be simultaneously communicated by a single panel. In some cases, a panel identification (ID) or virtual panel ID may be associated with a set of beams that correspond to a number of different reference signal resources, different reference signal resource ports, different reference signal resource sets, different spatial relations (e.g., different beamforming directions), different spatial filters, or any combinations thereof. In some cases the reference signals may include one or more of a sounding reference signal (SRS), a channel state information reference signal (CSI-RS), a demodulation reference signal (DMRS), or any combinations thereof. In some cases, the panel-specific capabilities may indicate one or more of a capability to support simultaneous communications using multiple beams on multiple panels, a number of spatial layers or ranks per beam or panel, a maximum number of spatial layers or ranks supported across all beams or panels, supported combinations of spatial layers or ranks across beams or panels that support simultaneous communications, or any combinations thereof.

Techniques such as described in various aspects of the disclosure may allow a base station and a UE to identify and configure beams to provide efficient beamformed communications between the UE and the base station. In some cases, the UE and base station may establish one or more beam pair links (BPLs) that may be used for communications between the UE and the base station. In some cases, uplink transmission beams that are transmitted by the UE may be quasi co-located (QCL) with downlink transmissions beams that are transmitted by the base station to the UE (e.g., uplink and downlink beamforming parameters may be determined based on beam reciprocity). In other cases, an uplink beam of the UE may not be QCL with the downlink beam of the base station, and transmission beams in such cases may be referred to as decoupled beams. Decoupled beams may result, for example, from interference that may be present at an uplink beam but not a downlink beam (e.g., an obstructed UE antenna panel used for uplink transmissions, an interfering device in proximity to the UE, etc.), maximum permissible exposure (MPE) limits associated with a particular uplink beam or antenna panel at the UE, available power that may be used for an uplink transmission, or any combinations thereof.

In some cases, the base station may configure different sets of reference signals that are associated with the different beams. For example, a first uplink beam of a first antenna panel may have an associated first set of reference signals, and a second uplink beam of a second antenna panel may have an associated second set of reference signals that is different than the first set of reference signals. In some cases, one or more beamforming parameters of the first uplink beam and the second uplink beam may be based at least in part on measurements of the associated first set of reference signals and second set of reference signals made at the UE or at the base station. Thus, in some cases, an antenna panel may be identified based on reference signals, reference signal resources, or reference signal resource sets of reference signals that may be received or transmitted by the antenna panel.

In some cases, antenna panels at a UE may correspond to a hardware antenna module having a number of physical antenna elements that may be used to form beams for the associated reference signals, reference signal resources, or reference signal resource sets. In some cases, two or more virtual antenna panels may be identified at a UE, where each virtual panel may include one or more antenna elements on a same physical antenna module (e.g., one antenna module may have all or a portion of the antenna elements for two or more virtual panels) or on different physical antenna modules (e.g., a virtual panel may include antenna elements that are located on two or more physical antenna modules). In some cases, a single antenna module may have one or more antenna elements that are associated with a first virtual antenna panel, and may have one or more other antenna elements that are associated with a second virtual antenna panel.

Techniques as discussed herein may thus provide for efficient identification of antenna panels and indications of panel-specific capabilities of a UE. A base station may identify the panel-specific capabilities of one or more UEs, and may allocate resources on one or more beams in accordance with the UE capabilities. Such techniques may thus enhance the efficiency and reliability of a wireless communications system through more efficient beamformed communications.

Aspects of the disclosure are initially described in the context of a wireless communications system. Examples of antenna panels and modules are then provided in accordance with some aspects of the disclosure. Aspects of the disclosure are further illustrated by and described with reference to apparatus diagrams, system diagrams, and flowcharts that relate to antenna panel capability determination and indication in wireless communications.

FIG. 1 illustrates an example of a wireless communications system 100 that supports antenna panel capability determination and indication in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, a UE 115 may have two or more antenna panels that may be used for beamformed communications. Such UEs 115, in some cases, may identify multiple antenna panels, and determination of panel-specific capabilities for the multiple antenna panels. In some cases, the UE 115 may determine whether simultaneous communications using two or more antenna panels is supported (e.g., based on a predetermined rule that indicates such simultaneous communications are supported or unsupported, a capability of the UE 115, a configuration of a serving base station 105, or any combinations thereof). In some cases, the UE 115 may transmit panel-specific capabilities to the base station 105, that may be used by the base station 105 and UE 115 for subsequent beamformed communications.

In some cases, each of the multiple antenna panels has an associated set of beams that can be supported at the antenna panel, where different beams associated with a same antenna panel cannot support simultaneous communications (e.g., due to hardware constraints of the antenna panel). In some cases, a panel ID (or virtual panel ID) may be associated with a set of beams that correspond to a number of different reference signal resources, different reference signal resource ports, different reference signal resource sets, different spatial relations (e.g., different beamforming directions), different spatial filters, or any combinations thereof. In some cases the reference signals may include one or more of an SRS, a CSI-RS, a DMRS, or any combinations thereof. In some cases, the panel-specific capabilities may indicate one or more of a capability to support simultaneous communications using multiple beams on multiple panels, a number of spatial layers or ranks per beam or panel, a maximum number of spatial layers or ranks supported across all beams or panels, supported combinations of spatial layers or ranks across beams or panels that support simultaneous communications, or any combinations thereof.

Figure 2:
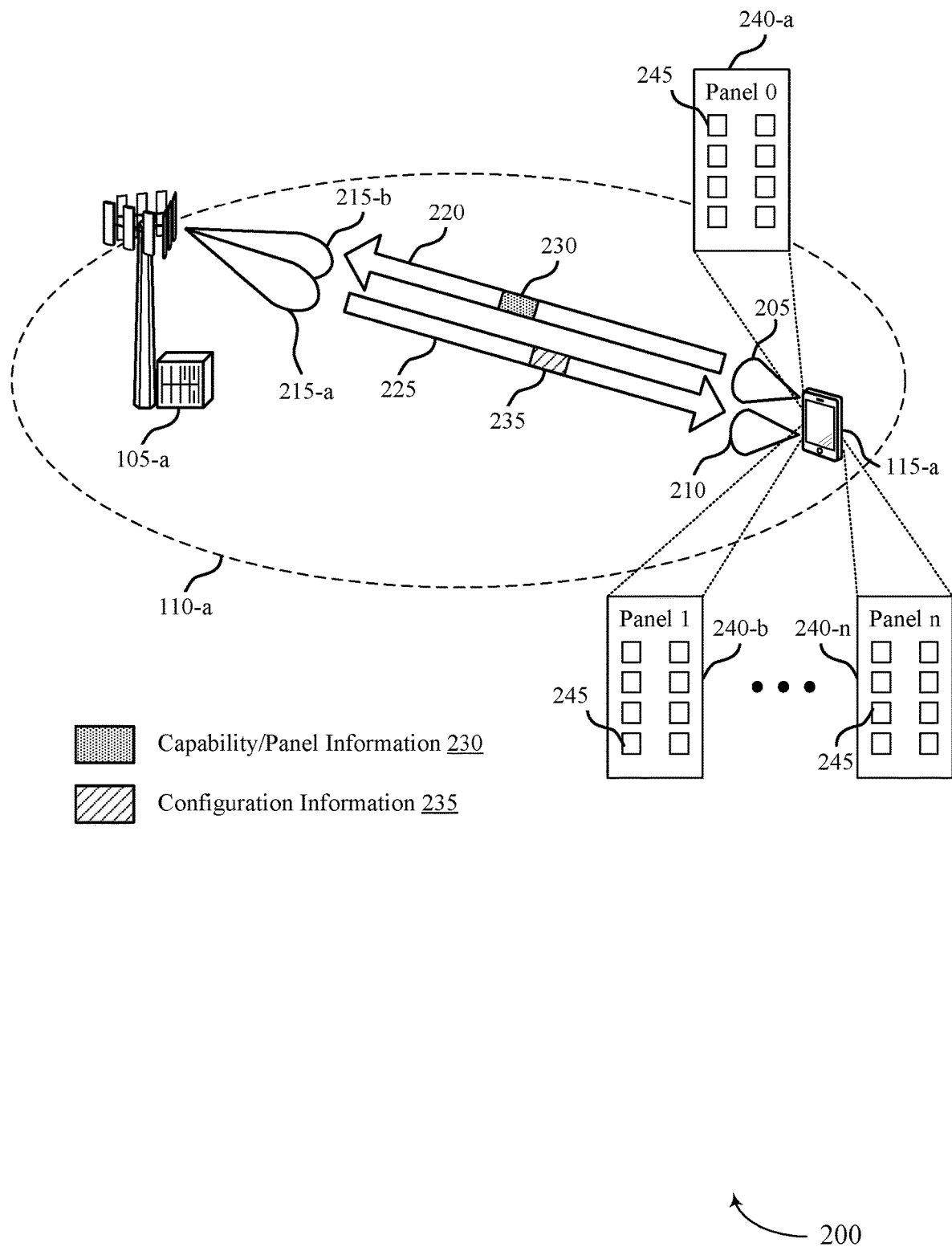
FIG. 2 illustrates an example of a portion of a wireless communications system that supports antenna panel capability determination and indication in wireless communications in accordance with aspects of the present disclosure.

FIG. 2 illustrates an example of a portion of a wireless communications system 200 that supports antenna panel capability determination and indication in wireless communications in accordance with aspects of the present disclosure. In some examples, wireless communications system 200 may implement aspects of wireless communications system 100. In the example of FIG. 2, wireless communications system 200 may include base station 105-*a* and UE 115-*a*, which may be examples of the corresponding devices described with respect to FIG. 1. Base station 105-*a* may provide network coverage for geographic coverage area 110-*a*. The base station 105-*a* may transmit beamformed communications using downlink beams 215, which may include a first downlink beam 215-*a*, a second downlink beam 215-*b*, one or more other downlink beams, or combinations thereof. The UE 115-*a* may transmit uplink communications to the base station 105-*a* using a first uplink beam 205, a second uplink beam 210, one or more other uplink beams, or any combinations thereof.

To support MIMO communications between base station 105-*a* and UE 115-*a*, UE 115-*a* may transmit capability/panel information 230 to base station 105-*a* on an uplink channel 220. For example, UE 115-*a* may transmit an indication of a number of antenna panels, whether the UE 115 supports simultaneous communications on multiple panels, and the like. In some cases, the base station 105-*a* may transmit configuration information 235 to the UE 115-*a* on a downlink channel 225. For example, the base station 105-*a* may transmit a beamforming configuration for beamformed communications using one or more antenna panels 240 at the UE 115-*a*.

In this example, UE 115-*a* has a number (n) of antenna panels 240, which include a first antenna panel 240-*a*, a second antenna panel 240-*b*, and an nth antenna panel 240-*n*, that may each include a number of antenna elements 245. In some cases, the multiple antenna panels 240 may each be suitable for communications using certain transmission beams. For example the first antenna panel 240-*a* may have a configuration that supports transmissions and receptions in accordance with beamforming parameters of the first uplink beam 205, and one or more other uplink beams that have similar beamforming parameters or beam direction within a certain range of the first uplink beam 205. Likewise, the second antenna panel 240-*b* may have a configuration that supports communications using a number of different transmission beams.

In some cases, antenna panels 240 may be identified based on the associated set of beams that may be supported using antenna elements 245 of the antenna panel 240. The UE may thus identify multiple antenna panels 240 according to the sets of beams that may be transmitted or received. The identification of multiple antenna panels 240, as well as panel-specific capabilities associated with the identified antenna panels 240, are described in more detail with reference to FIG. 3.

Figure 3:
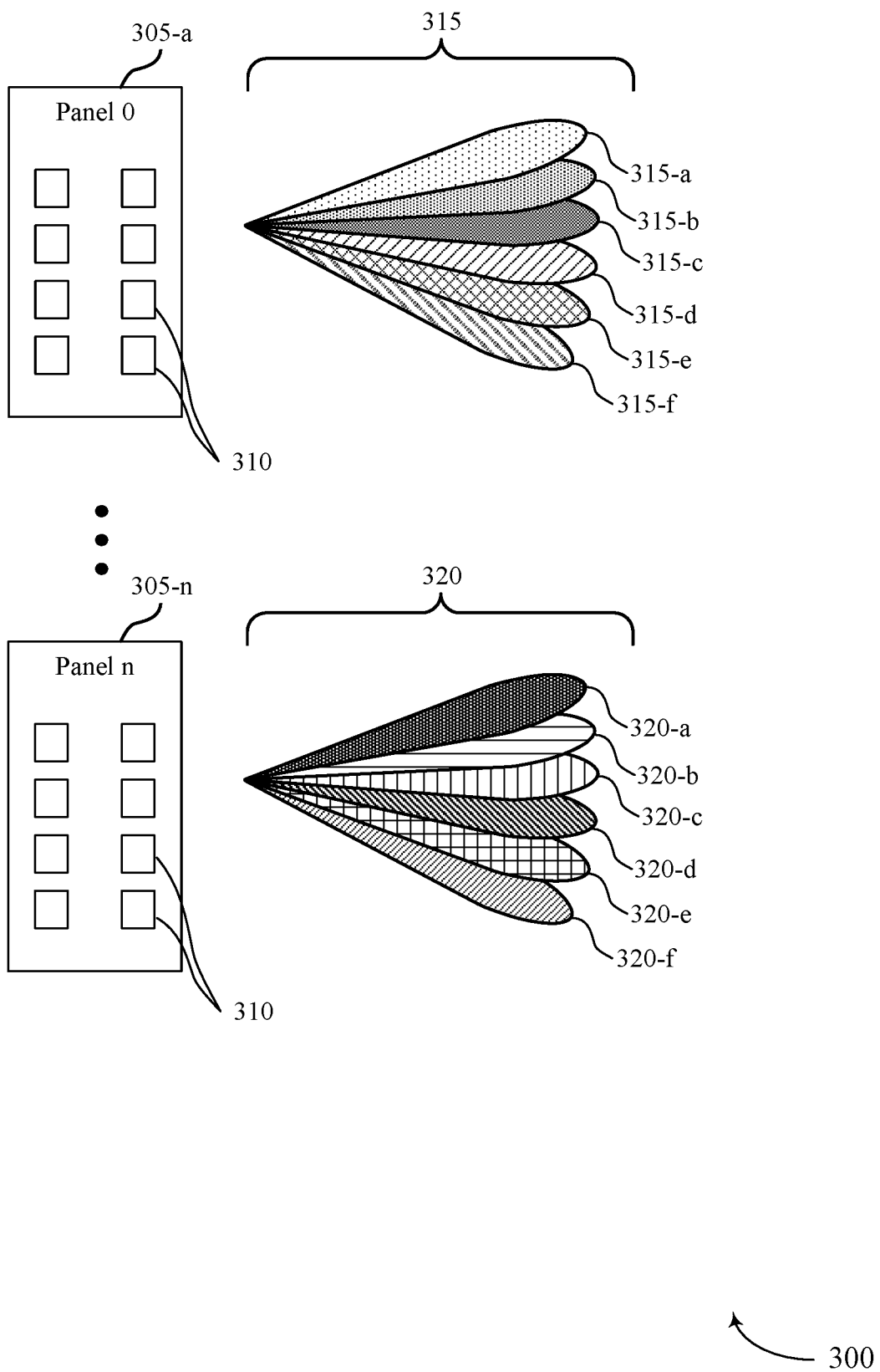
FIG. 3 illustrates an example of an antenna panel configuration that supports antenna panel capability determination and indication in wireless communications in accordance with aspects of the present disclosure.

FIG. 3 illustrates an example of an antenna panel configuration 300 that supports antenna panel capability determination and indication in wireless communications in accordance with aspects of the present disclosure. In some examples, antenna panel configuration 300 may implement aspects of wireless communications system 100 or 200. In this example, a first antenna panel 305-*a* may include a number of antenna elements 310, and an nth antenna panel 305-*n* may include a number of antenna elements 310. Antenna panels 305 may be examples of antenna panels 240 of FIG. 2, for example, or examples of an antenna module 400 of FIG. 4. In some cases, antenna panels 305 may be virtual panels of two or more antenna elements 310 of one or more physical antenna module. In this example, the first antenna panel 305-*a* may support communications on a first set of beams 315, and the nth antenna panel 305-*n* may support communications on an nth set of beams 320, where beams of the different sets of beams do not overlap. The first set of beams 315 and the nth set of beams 320 may be analog beams transmitted in mmW frequencies, in some cases.

In some cases, each antenna panel 305 may have a panel ID that can be used at least for indicating panel-specific uplink transmission information. For example, a base station may configure uplink communications using a beam associated with a particular panel ID. As discussed herein, in some cases antenna panels 305 may be identified based on the set of beams 315 or 320 that may be supported at the particular antenna panel 305. In some cases, the set of beams, and thus the panel ID, may be provided by an SRS resource set ID, an ID which is directly associated to a reference signal resource and/or resource set, an ID which can be assigned for a target reference signal resource or resource set, an ID which is configured in spatial relation information of the UE, or any combinations thereof. In some cases, the reference signals used to determine panel IDs may be an SRS, CSI-RS, a DMRS, or any other reference signal that may be used in communications between a UE and a base station.

In some cases, the antenna panel 305 (or virtual panel) associated with each panel ID may have a number of behaviors. In some cases, such behaviors may include that beams associated with some panels may not be transmitted simultaneously (e.g., due to hardware constraints at the associated panel). In some cases, the beams per panel can correspond to different reference signal resources, reference signal resource ports, reference signal resource sets, spatial relations, spatial filters, etc., or any combinations thereof.

In some cases, whether beams associated with different antenna panels 305 may be transmitted simultaneously may be specified by a rule in a specification or indicated by a UE capability. In some cases, two or more beams may be transmitted simultaneously, and any beams associated with different antenna panels 305 may be transmitted simultaneously. In other cases, any beams associated with different antenna panels 305 may not be transmitted simultaneously. In other cases, beams associated with different antenna panels 305 may or may not be transmitted simultaneously, and whether such beams are transmitted simultaneously may be configurable. Further, in some cases, for any two or more antenna panels 305, certain sets of beams may be transmitted simultaneously. For example, the first set of beams 315 may be transmitted simultaneously with the nth set of beams 320, but may not be transmitted simultaneously with a third set of beams of a third antenna panel (e.g., due to hardware constraints, interference between beams of different panels, etc.). In some cases, one or more subsets of beams of a particular antenna panel 305 may or may not be transmitted simultaneously with one or more sets or subsets of beams of another antenna panel 305. Additionally, in some cases, a maximum supported number of spatial layers or ranks per beam/panel may be a fixed value or dependent on UE capability. For example, if beams per panel correspond to different reference signals resources, the maximum number of reference signal resource ports per resource/beam may be a fixed value (e.g., 1, 2, 4) or depend on UE capability.

In some cases, the UE may provide information to the base station on the UE capabilities related to panel specific operation. In some cases, the UE may indicate whether panel-specific operation is supported or unsupported. In cases where panel-specific operation is unsupported, the panel ID may not be used, and beamforming parameters may be configured for a single panel. In cases where panel-specific operation is supported, the UE may provide an indication of parameters/capabilities for panel related operation. For example, the UE may provide an indication of one or more of a number of panels, a number of beams per panel, a number of spatial layers per beam/panel, combinations of beams/panels and corresponding spatial layers, or any combinations thereof. As discussed herein, the beams per panel may correspond to different reference signal resources, reference signal resource ports, reference signal resource sets, spatial relations, spatial filters, etc. In some cases, panel-specific operation may be implicitly indicated by a capability to support SRS resources for uplink beam management.

In some cases, the UE may provide an indication of whether beams associated with different panels may be transmitted simultaneously. In some cases, the UE may indicate any beams from any set of different panels may or may not be transmitted simultaneously. In some cases, the UE can indicate a supported number of panels that support simultaneous communications and corresponding panel IDs. In some cases, for a given pair of panels, the UE may indicate a set of beams of one panel that may be transmitted simultaneously with a set of beams of another panel, where the set can be the whole set or a subset of beams per panel.

In some cases, the UE may provide an indication of a maximum and/or each supported number of spatial layers/ranks per beam/panel. For example, if beams per panel correspond to different reference signal resources, the UE may indicate a maximum number of reference signal resource ports per resource/beam, where the reference signal resource includes an SRS resource, CSI-RS resource, or any combination thereof.

In some cases, the UE may indicate supported combinations of a number of spatial layers/ranks across each supported number of simultaneously transmitted panels, as well as a maximum supported total number of spatial layers/ranks. For example, if the UE supports a maximum rank of 2, supported rank combinations may include 1+1, 2+0, 0+2, in case of 2 panels. In other examples, if the UE supports maximum rank of four, supported rank combinations may additionally include 2+2, 4+0, 0+4, 3+1, 1+3, in case of 2 panels. In some cases, the UE can indicate panel related capabilities separately for different frequency bands (e.g., 28 & 60 GHz).

Figure 4:
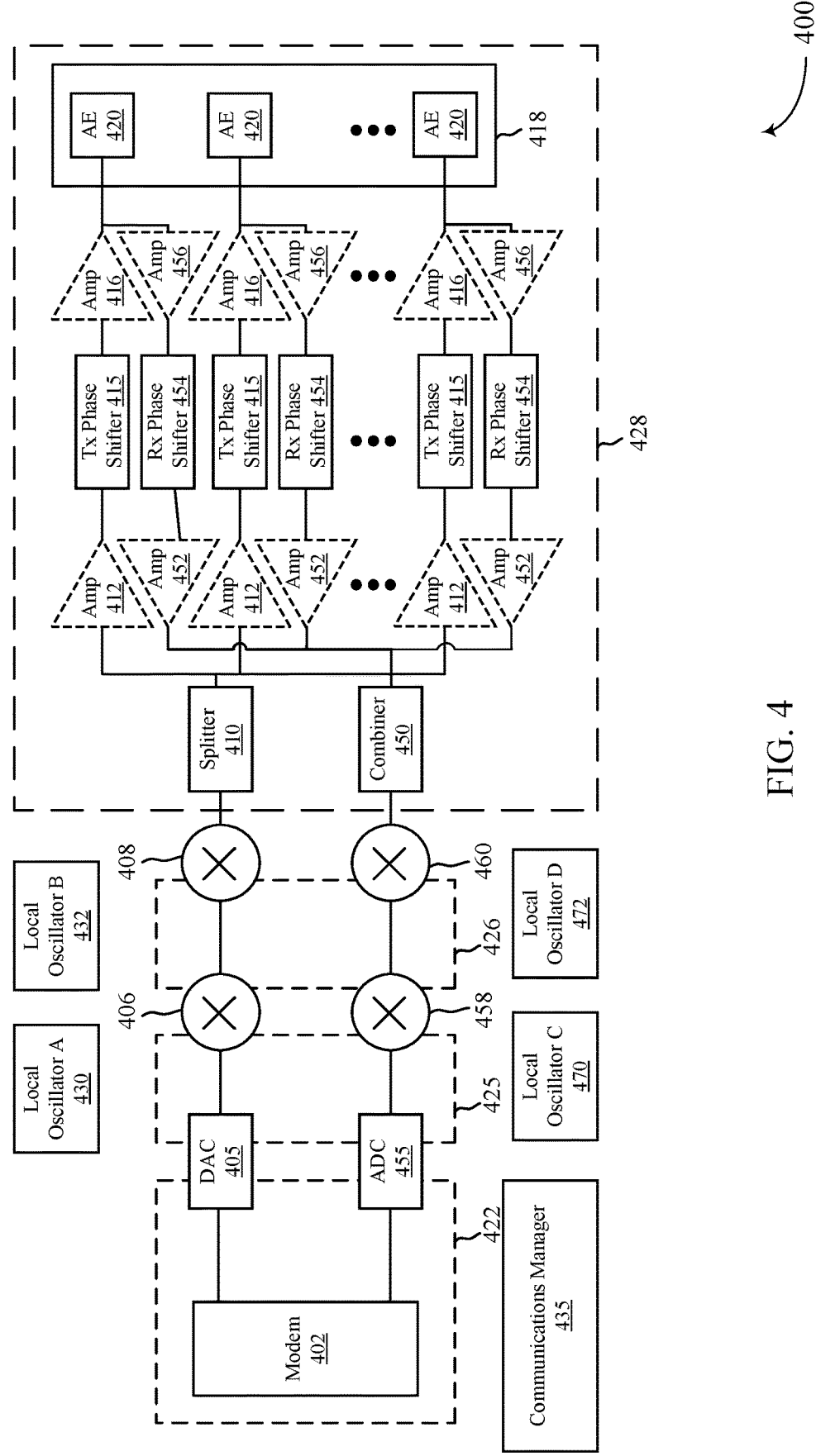
FIG. 4 illustrates an example of an antenna module that supports antenna panel capability determination and indication in wireless communications in accordance with aspects of the present disclosure.

FIG. 4 illustrates an example of an antenna module 400 that supports antenna panel capability determination and indication in wireless communications in accordance with aspects of the present disclosure. In some examples, antenna module 400 may implement aspects of wireless communications systems 100 or 200, as described with reference to FIGS. 1 and 2. In some examples, antenna module 400 may be an example of an antenna panel 240 or 305 of FIGS. 2 and 3. In some examples, antenna module 400 may be incorporated in a transmitting device or a receiving device (e.g., a UE or a base station), as described herein.

Broadly, FIG. 4 is a diagram illustrating example hardware components of a wireless device in accordance with certain aspects of the disclosure. The illustrated components may include those that may be used for antenna element selection and/or for beamforming for transmission of wireless signals. Further, some components illustrated in FIG. 4 (e.g., modem, communications manager, oscillators, etc.) may be shared with one or more other antenna modules that may be included in a transmitting device or a receiving device. It is noted that there are numerous architectures for antenna element selection and implementing beamforming, only one example of which is illustrated here. The antenna module 400 includes a modem (modulator/demodulator) 402, a digital to analog converter (DAC) 405, a first mixer 406, a second mixer 408, and a splitter 410. The antenna module 400 also includes a plurality of first amplifiers 412, a plurality of phase shifters 415, a plurality of second amplifiers 416, and an antenna array 418 that includes a plurality of antenna elements 420. Transmission lines or other waveguides, wires, traces, or the like are shown connecting the various components to illustrate how signals to be transmitted may travel between components. Boxes 422, 425, 426, and 428 indicate regions in the antenna module 400 in which different types of signals travel or are processed. Specifically, box 422 indicates a region in which digital baseband signals travel or are processed, box 425 indicates a region in which analog baseband signals travel or are processed, box 426 indicates a region in which analog intermediate frequency (IF) signals travel or are processed, and box 428 indicates a region in which analog radio frequency (RF) signals travel or are processed. The architecture also includes a local oscillator A 430, a local oscillator B 432, and a communications manager 435.

Each of the antenna elements 420 may include one or more sub-elements for radiating or receiving RF signals. For example, a single antenna element 420 may include a first sub-element cross-polarized with a second sub-element that can be used to independently transmit cross-polarized signals (e.g., in different ranks or layers). The antenna elements 420 may include patch antennas or other types of antennas arranged in a linear, two dimensional, or other pattern. A spacing between antenna elements 420 may be such that signals with a desired wavelength transmitted separately by the antenna elements 420 may interact or interfere (e.g., to form a desired beam). For example, given an expected range of wavelengths or frequencies, the spacing may provide a quarter wavelength, half wavelength, or other fraction of a wavelength of spacing between neighboring antenna elements 420 to allow for interaction or interference of signals transmitted by the separate antenna elements 420 within that expected range.

The modem 402 processes and generates digital baseband signals and may also control operation of the DAC 405, first and second mixers 406, 408, splitter 410, first amplifiers 412, phase shifters 415, and/or the second amplifiers 416 to transmit signals via one or more or all of the antenna elements 420. The modem 402 may process signals and control operation in accordance with a communication standard such as a wireless standard discussed herein. The DAC 405 may convert digital baseband signals received from the modem 402 (and that are to be transmitted) into analog baseband signals. The first mixer 406 upconverts analog baseband signals to analog IF signals within an IF using a local oscillator A 430. For example, the first mixer 406 may mix the signals with an oscillating signal generated by the local oscillator A 430 to "move" the baseband analog signals to the IF. In some cases some processing or filtering may take place at the IF. The second mixer 408 upconverts the analog IF signals to analog RF signals using the local oscillator B 432. Similarly to the first mixer, the second mixer 408 may mix the signals with an oscillating signal generated by the local oscillator B 432 to "move" the IF analog signals to the RF, or the frequency at which signals will be transmitted or received. The modem 402 and/or the communications manager 435 may adjust the frequency of local oscillator A 430 and/or the local oscillator B 432 so that a desired IF and/or RF frequency is produced and used to facilitate processing and transmission of a signal within a desired bandwidth.

In the illustrated antenna module 400, signals upconverted by the second mixer 408 are split or duplicated into multiple signals by the splitter 410. The splitter 410 in antenna module 400 splits the RF signal into a plurality of identical or nearly identical RF signals, as denoted by its presence in box 428. In other examples, the split may take place with any type of signal including with baseband digital, baseband analog, or IF analog signals. Each of these signals may correspond to an antenna element 420 and the signal travels through and is processed by amplifiers 412, 416, phase shifters 415, and/or other elements corresponding to the respective antenna element 420 to be provided to and transmitted by the corresponding antenna element 420 of the antenna array 418. In one example, the splitter 410 may be an active splitter that is connected to a power supply and provides some gain so that RF signals exiting the splitter 410 are at a power level equal to or greater than the signal entering the splitter 410. In another example, the splitter 410 is a passive splitter that is not connected to power supply and the RF signals exiting the splitter 410 may be at a power level lower than the RF signal entering the splitter 410.

After being split by the splitter 410, the resulting RF signals may enter an amplifier, such as a first amplifier 412, or a phase shifter 415 corresponding to an antenna element 420. The first amplifier 412 and second amplifier 416 are illustrated with dashed lines because one or both of them might not be used in some implementations. In one implementation, both the first amplifier 412 and second amplifier 416 are present. In another, neither the first amplifier 412 nor the second amplifier 416 is present. In other implementations, one of the two amplifiers 412, 416 is present but not the other. By way of example, if the splitter 410 is an active splitter, the first amplifier 412 may not be used. By way of further example, if the phase shifter 415 is an active phase shifter that can provide a gain, the second amplifier 416 might not be used. The amplifiers 412, 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element. Each of the amplifiers 412, 416 may be controlled independently (e.g., by the modem 402 or communications manager 435) to provide independent control of the gain for each antenna element 420. For example, the modem 402 and/or the communications manager 435 may have at least one control line connected to each of the splitter 410, first amplifiers 412, phase shifters 415, and/or second amplifiers 416 which may be used to configure a gain to provide a desired amount of gain for each component and thus each antenna element 420.

The phase shifter 415 may provide a configurable phase shift or phase offset to a corresponding RF signal to be transmitted. The phase shifter 415 could be a passive phase shifter not directly connected to a power supply. Passive phase shifters might introduce some insertion loss. The second amplifier 416 could boost the signal to compensate for the insertion loss. The phase shifter 415 could be an active phase shifter connected to a power supply such that the active phase shifter provides some amount of gain or prevents insertion loss. The settings of each of the phase shifters 415 are independent meaning that each can be set to provide a desired amount of phase shift or the same amount of phase shift or some other configuration. The modem 402 and/or the communications manager 435 may have at least one control line connected to each of the phase shifters 415 and which may be used to configure the phase shifters 415 to provide a desired amounts of phase shift or phase offset between antenna elements 420.

In the illustrated antenna module 400, RF signals received by the antenna elements 420 are provided to one or more of first amplifier 456 to boost the signal strength. The first amplifier 456 may be connected to the same antenna arrays 418, e.g., for TDD operations. The first amplifier 456 may be connected to different antenna arrays 418. The boosted RF signal is input into one or more of phase shifter 454 to provide a configurable phase shift or phase offset for the corresponding received RF signal. The phase shifter 454 may be an active phase shifter or a passive phase shifter. The settings of the phase shifters 454 are independent, meaning that each can be set to provide a desired amount of phase shift or the same amount of phase shift or some other configuration. The modem 402 and/or the communications manager 435 may have at least one control line connected to each of the phase shifters 454 and which may be used to configure the phase shifters 454 to provide a desired amount of phase shift or phase offset between antenna elements 420.

The outputs of the phase shifters 454 may be input to one or more second amplifiers 452 for signal amplification of the phase shifted received RF signals. The second amplifiers 452 may be individually configured to provide a configured amount of gain. The second amplifiers 452 may be individually configured to provide an amount of gain to ensure that the signal input to combiner 450 have the same magnitude. The amplifiers 452 and/or 456 are illustrated in dashed lines because they might not be necessary in some implementations. In one implementation, both the amplifier 452 and the amplifier 456 are present. In another, neither the amplifier 452 nor the amplifier 456 are present. In other implementations, one of the amplifiers 452, 456 is present but not the other.

In the illustrated antenna module 400, signals output by the phase shifters 454 (via the amplifiers 452 when present) are combined in combiner 450. The combiner 450 in architecture combines the RF signal into a signal, as denoted by its presence in box 428. The combiner 450 may be a passive combiner, e.g., not connected to a power source, which may result in some insertion loss. The combiner 450 may be an active combiner, e.g., connected to a power source, which may result in some signal gain. When combiner 450 is an active combiner, it may provide a different (e.g., configurable) amount of gain for each input signal so that the input signals have the same magnitude when they are combined. When combiner 450 is an active combiner, it may not use the second amplifier 452 because the active combiner may provide the signal amplification.

The output of the combiner 450 is input into mixers 458 and 460. Mixers 458 and 460 generally down convert the received RF signal using inputs from local oscillators 472 and 470, respectively, to create intermediate or baseband signals that carry the encoded and modulated information. The output of the mixers 458 and 460 are input into an analog-to-digital converter (ADC) 455 for conversion to analog signals. The analog signals output from ADC 455 is input to modem 402 for baseband processing, e.g., decoding, de-interleaving, etc.

The antenna module 400 is given by way of example only to illustrate an architecture for transmitting and/or receiving signals. It will be understood that the antenna module 400 and/or each portion of the antenna module 400 may be repeated multiple times within an architecture to accommodate or provide an arbitrary number of RF chains, antenna elements, and/or antenna panels. Furthermore, numerous alternate architectures are possible and contemplated. For example, although only a single antenna array 418 is shown, two, three, or more antenna arrays may be included each with one or more of their own corresponding amplifiers, phase shifters, splitters, mixers, DACs, ADCs, and/or modems. For example, a single UE may include two, four or more antenna panels or virtual antenna panels for transmitting or receiving signals at different physical locations on the UE or in different directions. Furthermore, mixers, splitters, amplifiers, phase shifters and other components may be located in different signal type areas (e.g., different ones of the boxes 422, 425, 426, 428) in different implemented architectures. For example, a split of the signal to be transmitted into a plurality of signals may take place at the analog RF, analog IF, analog baseband, or digital baseband frequencies in different examples. Similarly, amplification, and/or phase shifts may also take place at different frequencies. For example, in some contemplated implementations, one or more of the splitter 410, amplifiers 412, 416, or phase shifters 415 may be located between the DAC 405 and the first mixer 406 or between the first mixer 406 and the second mixer 408. In one example, the functions of one or more of the components may be combined into one component. For example, the phase shifters 415 may perform amplification to include or replace the first and/or or second amplifiers 412, 416. By way of another example, a phase shift may be implemented by the second mixer 408 to obviate the need for a separate phase shifter 415. This technique is sometimes called local oscillator (LO) phase shifting. In one implementation of this configuration, there may be a plurality of IF to RF mixers (e.g., for each antenna element chain) within the second mixer 408 and the local oscillator B 432 would supply different local oscillator signals (with different phase offsets) to each IF to RF mixer.

The modem 402 and/or the communications manager 435 may control one or more of the other components 405-472 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416. Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) can be dynamically controlled by modifying the phase shifts or phase offsets imparted by the phase shifters 415 and amplitudes imparted by the amplifiers 412, 416 of the plurality of signals relative to each other.

In some cases, a number of antenna modules 400 may be present at a UE, and each of the multiple antenna panels has an associated set of beams that can be supported at the antenna panel, as discussed herein. In some cases, a panel ID (or virtual panel ID) may be associated with a set of beams that correspond to a number of different reference signal resources, different reference signal resource ports, different reference signal resource sets, different spatial relations (e.g., different beamforming directions), different spatial filters, or any combinations thereof. In some cases the reference signals may include one or more of an SRS, a CSI-RS, a DMRS, or any combinations thereof. In some cases, the panel-specific capabilities may indicate one or more of a capability to support simultaneous communications using multiple beams on multiple panels, a number of spatial layers or ranks per beam or panel, a maximum number of spatial layers or ranks supported across all beams or panels, supported combinations of spatial layers or ranks across beams or panels that support simultaneous communications, or any combinations thereof.

Figure 5:
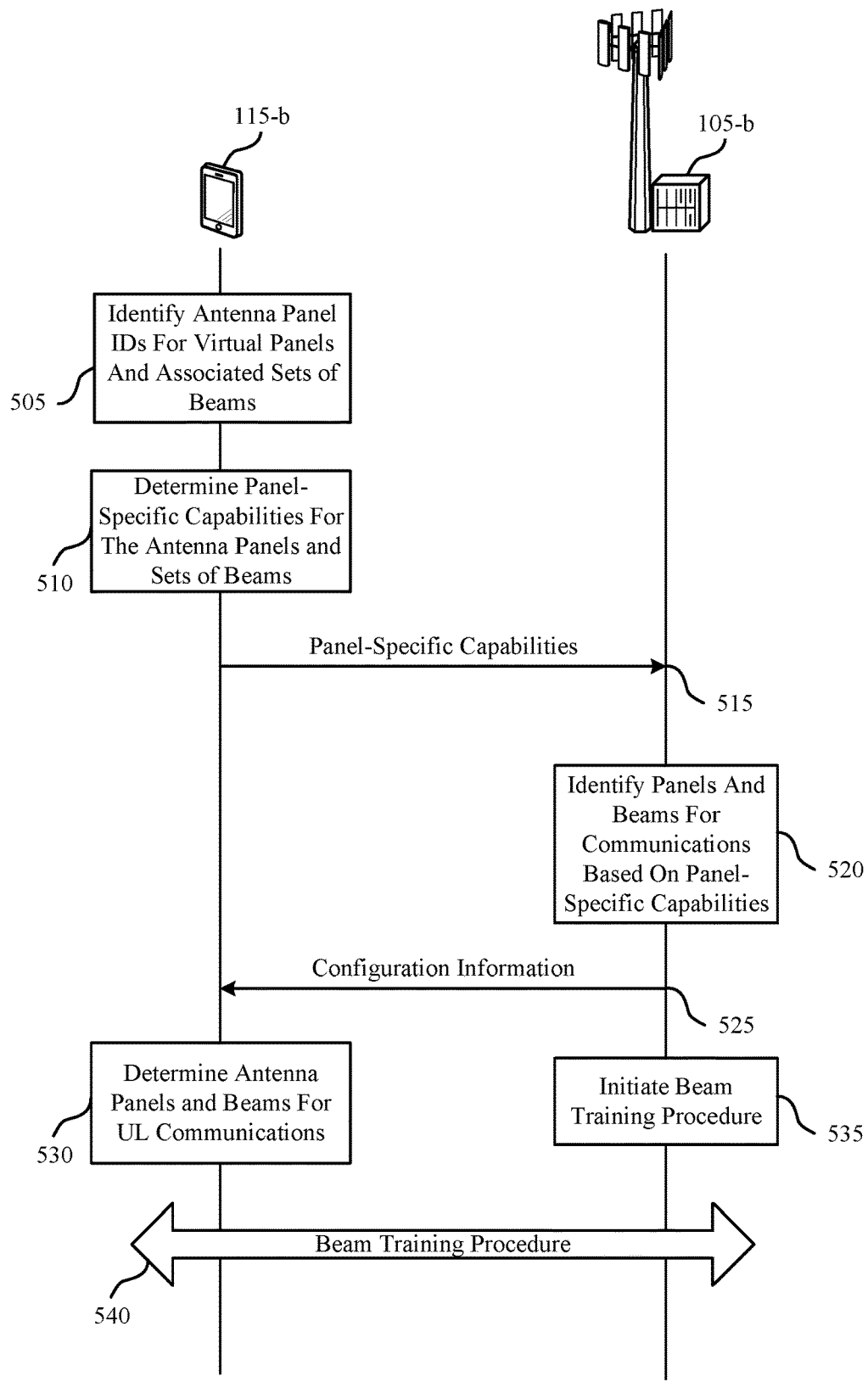
FIG. 5 illustrates an example of a process flow that supports antenna panel capability determination and indication in wireless communications in accordance with aspects of the present disclosure.

FIG. 5 illustrates an example of a process flow 500 that supports antenna panel capability determination and indication in wireless communications in accordance with aspects of the present disclosure. In some examples, process flow 500 may implement aspects of wireless communications system 100 or 200. The process flow 500 may include a base station 105-b and a UE 115-b, which may be examples of the corresponding devices described with reference to FIGS. 1 and 2. UE 115-b may have multiple antenna panels that may support transmissions on multiple beams. Alternative examples of the following may be implemented, where some steps are performed in a different order than described or are not performed at all. In some cases, steps may include additional features not mentioned herein, or further steps may be added.

At 505, UE 115-b may identify antenna panel IDs for virtual panels and associated sets of beams. In some cases, the antenna panel IDs may be determined based on reference signal resources, resource sets, etc., as discussed herein. In some case, the UE 115-b may identify the panel IDs based on one or more reference signals that are monitored at the UE 115-b (e.g., reference signals detected in one or more monitored synchronization signal blocks (SSBs) in a beam sweeping procedure of the base station 105-*b*). In some cases, the UE 115-*b* and base station 105-*b* may operate in a non-stand-alone (NSA) mode in which an anchor carrier may be used to configure the UE 115-*b* to establish beamformed communications. In other case, the UE 115-*b* and base station 105-*b* may operate in a stand-alone (SA) mode in which communications between the UE 115-*b* and base station 105-*b* exclusively use beamformed transmission beams.

At 510, the UE 115-*b* may determine panel-specific capabilities for the antenna panels and sets of beams. Such panel-specific capabilities may include, for example, capabilities for simultaneous transmissions of multiple panels, numbers of beams that are supported, sets or subsets of beams that may be simultaneously transmitted, ranks or spatial layers that may be transmitted, or combinations thereof, as discussed herein.

At 515, the UE 115-*b* may transmit panel-specific capabilities to the base station 105-*b*. In some cases, the panel-specific capabilities may be transmitted to the base station 105-*b* in RRC signaling (e.g., in during an RRC establishment, RRC reestablishment, or RRC reconfiguration). In other cases, the panel-specific capabilities may be transmitted to the base station 105-*b* in other signaling, such as using one or more medium access control (MAC) control elements (CEs), other uplink and downlink control signaling, or combinations thereof.

At 520, the base station 105-*b* may identify panels and beams for communications based on panel-specific capabilities. The panels and beams may be determined based on the indications and capabilities provided by the UE 115-*b*. At 525, the base station 105-*b* may transmit configuration information to the UE 115-*b* (e.g., via RRC signaling, in downlink control information to the UE 115-*b*, or combinations thereof). At 530, the UE 115-*b* may receive the configuration information and determine antenna panels and beams for uplink communications.

In some cases, at 535, the base station 105-*b* may initiate a beam training procedure, and the UE 115-*b* and base station 105-*b* may, at 540, may perform the beam training procedure (e.g., P1, P2, P3 procedures).

Figure 6:
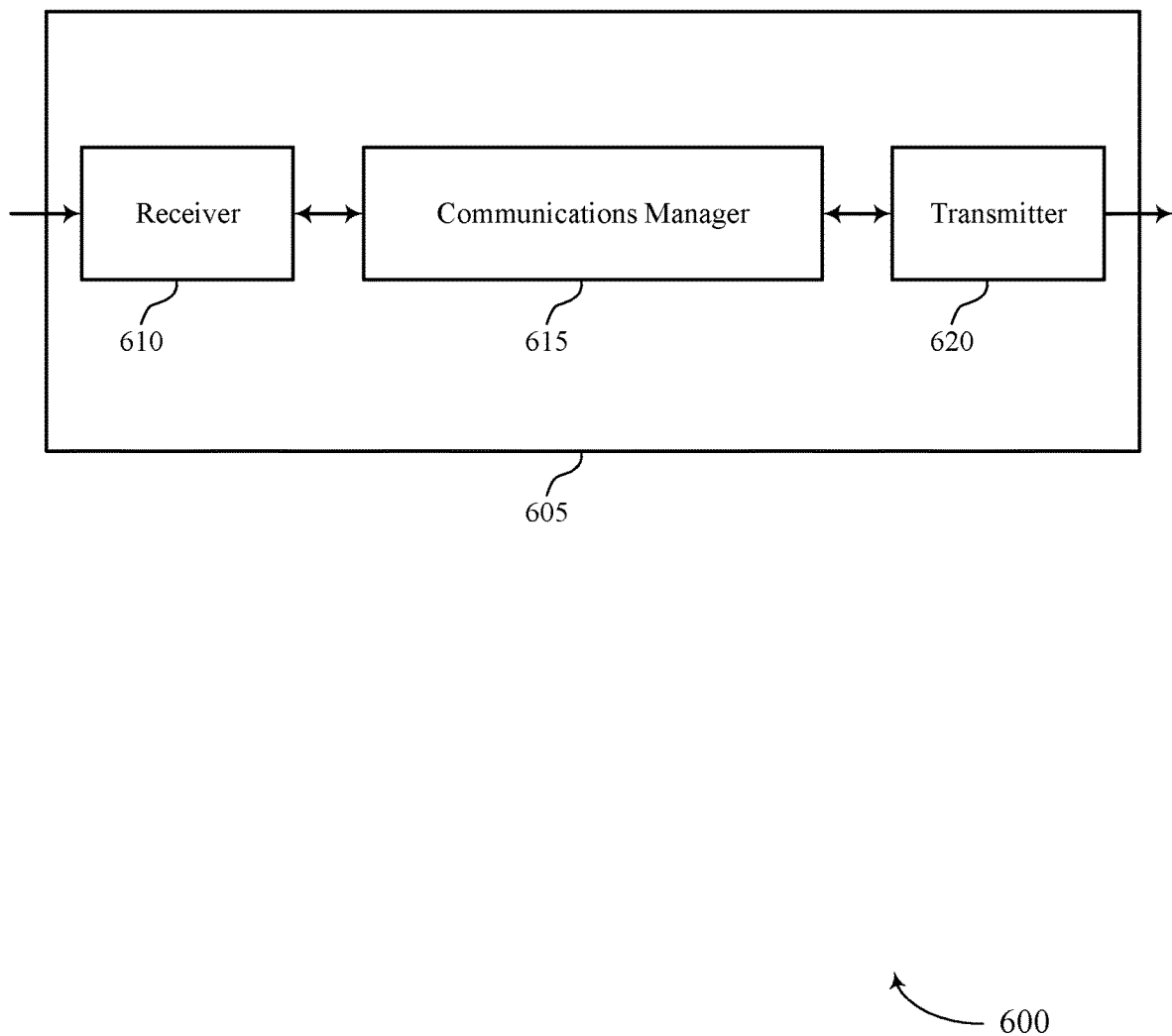
FIGS. 6 and 7 show block diagrams of devices that support antenna panel capability determination and indication in wireless communications in accordance with aspects of the present disclosure.

FIG. 6 shows a block diagram 600 of a device 605 that supports antenna panel capability determination and indication in wireless communications in accordance with aspects of the present disclosure. The device 605 may be an example of aspects of a UE 115 as described herein. The device 605 may include a receiver 610, a communications manager 615, and a transmitter 620. The device 605 may also include one or more processors, memory coupled with the one or more processors, and instructions stored in the memory that are executable by the one or more processors to enable the one or more processors to perform the antenna panel capability determination and indication features discussed herein. Each of these components may be in communication with one another (e.g., via one or more buses).

The receiver 610 may receive information such as packets, user data, or control information associated with various information channels (e.g., control channels, data channels, and information related to antenna panel capability determination and indication in wireless communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a first set of beams associated with a first antenna panel and a second set of beams associated with a second antenna panel, each beam of the first set of beams and the second set of beams having different beamforming characteristics for communications with a base station, determine that simultaneous communications via a first beam of the first set of beams and a second beam of the second set of beams is supported by the UE, determine a maximum number of supported spatial layers for each of the first beam and the second beam based at least in part on determining that simultaneous communications via the first beam and the second beam is supported, transmit, to the base station, a first indication that simultaneous communications via the first beam and the second beam is supported and second indication of the maximum number of supported spatial layers for each of the first beam and the second beam, and communicate with the base station using at least one of the first beam or the second beam based on the transmitting the first indication and the second indication.

The communications manager 615 may also identify two or more antenna panels for communications with a base station, each antenna panel of the two or more antenna panels configured to transmit a beam of an associated set of beams for communications with the base station, determine one or more panel-specific capabilities for the two or more antenna panels that are configurable for different panel-specific operations for the communications with the base station, and transmit an indication to the base station of the two or more antenna panels and associated panel-specific operations. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may enable the device 605 to improve efficiency and reliability of a system through more efficiently beamformed communications. This may result in fewer transmissions, fewer monitoring occasions, and, accordingly, fewer processing operations and longer sleep times for one or more processing units associated with transmitting and monitoring signals. As such, the device 605 may experience enhanced power savings and increased battery life.

Figure 7:
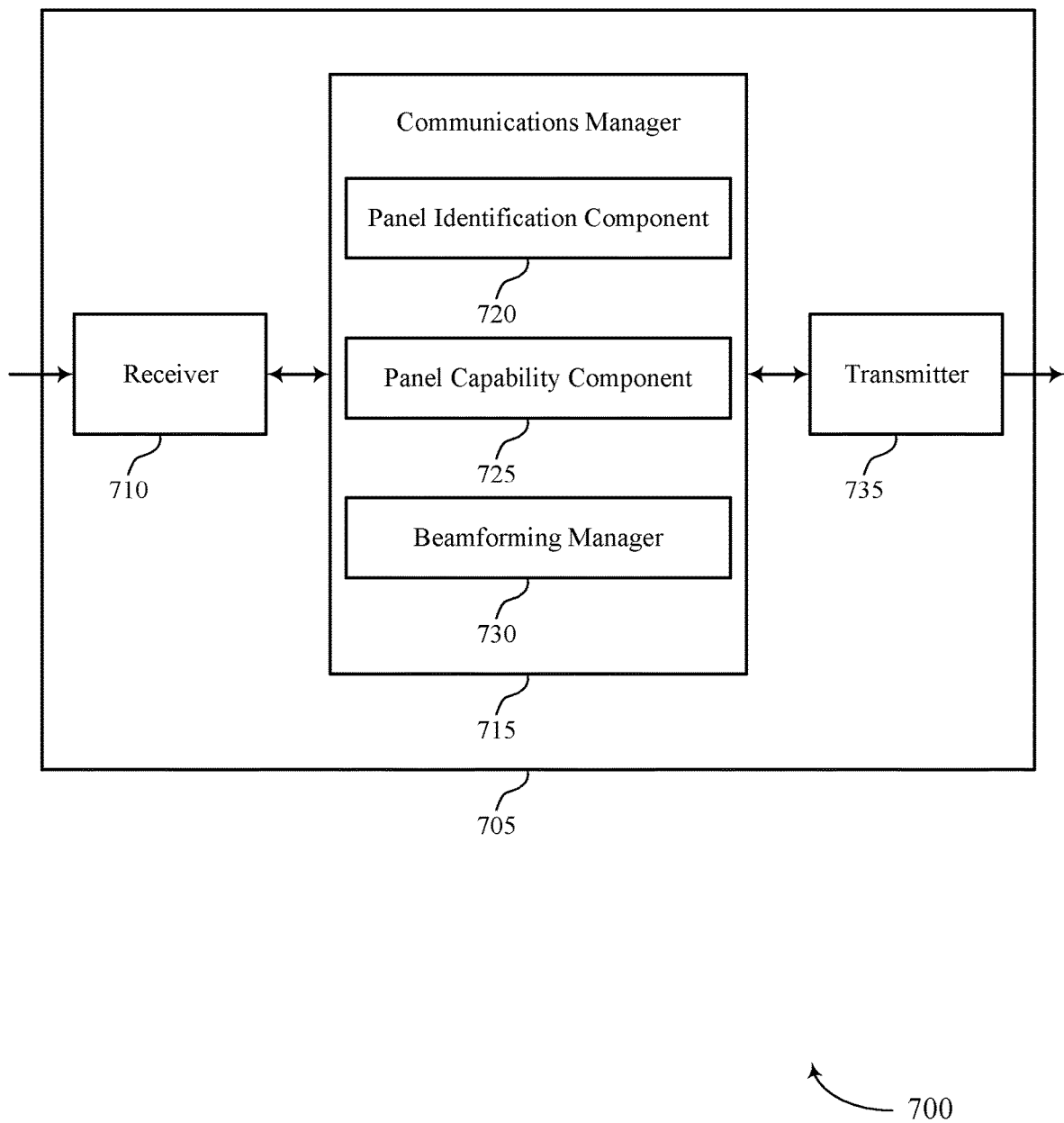

FIG. 7 shows a block diagram 700 of a device 705 that supports antenna panel capability determination and indication in wireless communications in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to antenna panel capability determination and indication in wireless communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a panel identification component 720, a panel capability component 725, and a beamforming manager 730. The communications manager 715 may be an example of aspects of the communications manager 910 described herein.

The panel identification component 720 may identify a first set of beams associated with a first antenna panel and a second set of beams associated with a second antenna panel, each beam of the first set of beams and the second set of beams having different beamforming characteristics for communications with a base station. The panel capability component 725 may determine that simultaneous communications via a first beam of the first set of beams and a second beam of the second set of beams is supported by the UE. The panel capability component 725 may determine a maximum number of supported spatial layers for each of the first beam and the second beam based at least in part on determining that simultaneous communications via the first beam and the second beam is supported. The panel capability component 725 may transmit, to the base station, a first indication that simultaneous communications via the first beam and the second beam is supported and a second indication of the maximum number of supported spatial layers for each of the first beam and the second beam. The beamforming manager 730 may communicate with the base station using at least one of the first beam or the second beam based on the transmitting the first indication and the second indication.

In some cases, the panel identification component 720 may identify two or more antenna panels for communications with a base station, each antenna panel of the two or more antenna panels configured to transmit a beam of an associated set of beams for communications with the base station. The panel capability component 725 may determine one or more panel-specific capabilities for the two or more antenna panels that are configurable for different panel-specific operations for the communications with the base station. The beamforming manager 730 may transmit an indication to the base station of the two or more antenna panels and associated panel-specific operations.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

In some cases, the panel identification component 720, the panel capability component 725, and the beamforming manager 730 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the panel identification component 720, the panel capability component 725, and the beamforming manager 730 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 8:
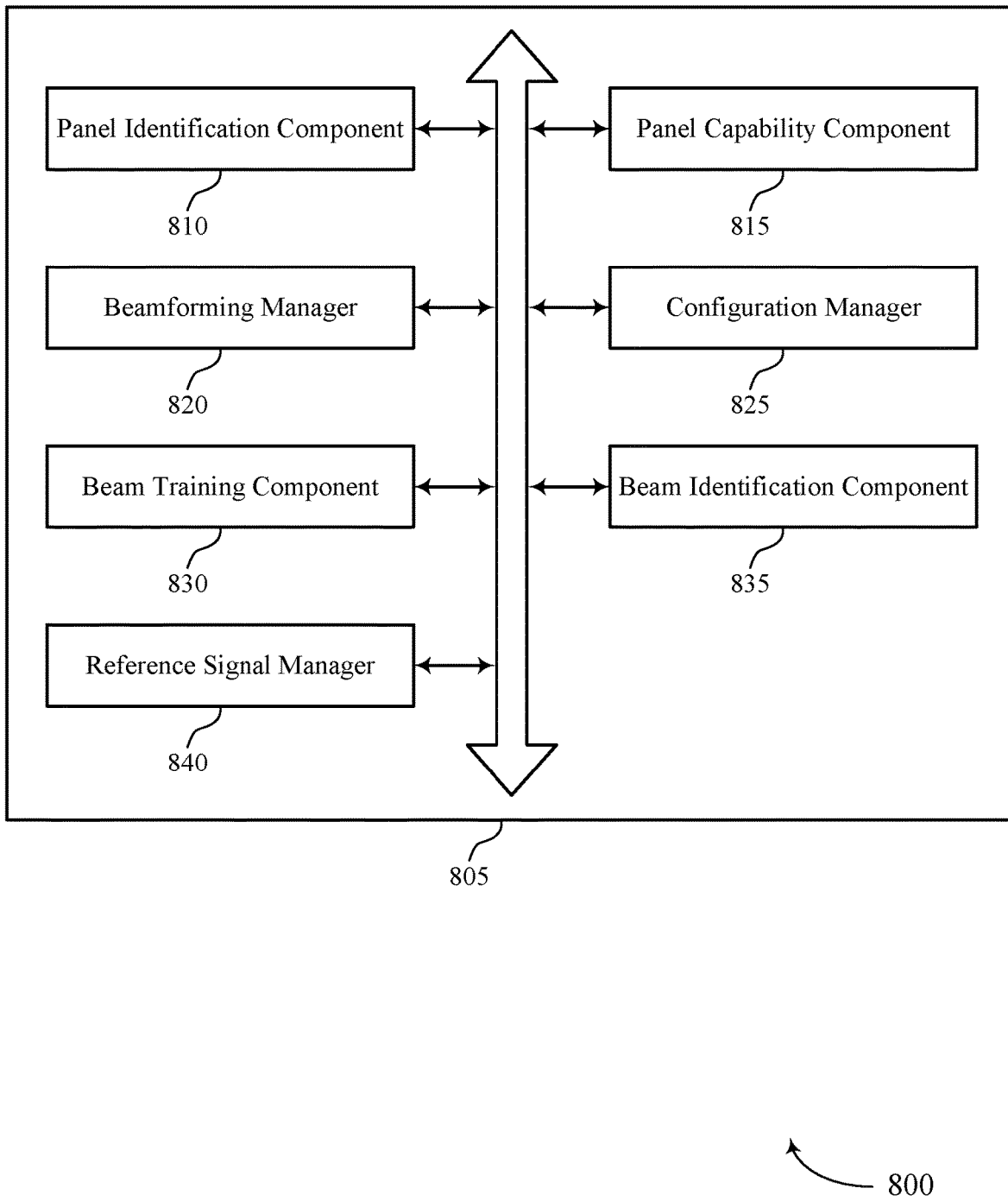
FIG. 8 shows a block diagram of a communications manager that supports antenna panel capability determination and indication in wireless communications in accordance with aspects of the present disclosure.

FIG. 8 shows a block diagram 800 of a communications manager 805 that supports antenna panel capability determination and indication in wireless communications in accordance with aspects of the present disclosure. The communications manager 805 may be an example of aspects of a communications manager 615, a communications manager 715, or a communications manager 910 described herein. The communications manager 805 may include a panel identification component 810, a panel capability component 815, a beamforming manager 820, a configuration manager 825, a beam training component 830, a beam identification component 835, and a reference signal manager 840. Each of these modules may communicate, directly or indirectly, with one another (e.g., via one or more buses).

The panel identification component 810 may identify a first set of beams associated with a first antenna panel and a second set of beams associated with a second antenna panel, each beam of the first set of beams and the second set of beams having different beamforming characteristics for communications with a base station.

In some examples, the panel identification component 810 may identify two or more antenna panels for communications with a base station, each antenna panel of the two or more antenna panels configured to transmit a beam of an associated set of beams for communications with the base station. In some cases, the first set of beams and the second set of beams correspond to different reference signal resources, different reference signal ports, different reference signal resource sets, different spatial resources, different spatial filters, or any combinations thereof. In some cases, each antenna panel at the UE is associated with a panel ID. In some cases, each panel ID is associated with a virtual antenna panel having two or more antenna elements that are co-located on a same antenna module or are located on different antenna modules. In some cases, the number of beams in each set of beams correspond to a number of different reference signal resources, different reference signal resource ports, different reference signal resource sets, different spatial relations, different spatial filters, or any combinations thereof.

The panel capability component 815 may determine whether simultaneous communications via a first beam of the first set of beams and a second beam of the second set of beams is supported. In some examples, the panel capability component 815 may determine one or more panel-specific capabilities for the two or more antenna panels that are configurable for different panel-specific operations for the communications with the base station. In some examples, the panel capability component 815 may determine that simultaneous communications using beams associated with different antenna panels is supported or unsupported based on one or more of a hardware configuration of the UE, a predetermined rule for communications via multiple antenna panels, a configuration provided by the base station, or any combinations thereof.

In some examples, the panel capability component 815 may determine that the hardware configuration of the UE supports simultaneous communications via multiple antenna panels. In some examples, the panel capability component 815 may transmit, the base station, an indication that simultaneous communications using beams associated with different antenna panels is supported by the UE. In some examples, the panel capability component 815 may determine that the hardware configuration of the UE does not support simultaneous communications via multiple antenna panels.

In some examples, the panel capability component 815 may transmit, the base station, an indication that simultaneous communication using beams associated with different antenna panels is unsupported by the UE. In some examples, the panel capability component 815 may determine a maximum number of supported spatial layers for each of the first beam and the second beam based on a fixed maximum number or a hardware capability of the UE.

In some examples, the panel capability component 815 may transmit one or more of a number of antenna panels, a number of beams in the associated set of beams per panel, a number of spatial layers associated with each beam or antenna panel, an indication of beam/panel combinations and corresponding spatial layers, or any combinations thereof. In some examples, the panel capability component 815 may determine that simultaneous communications using beams associated with different antenna panels is supported based on one or more of a hardware configuration of the UE, a predetermined rule for communications via multiple antenna panels, or any combinations thereof. In some examples, the panel capability component 815 may transmit, to the base station, an indication that simultaneous communications using beams associated with different antenna panels is supported by the UE. In some examples, the panel capability component 815 may transmit, to the base station, a first indication that simultaneous communications via a first beam and a second beam is support and a second indication of the maximum number of supported layers for each of the first beam and the second beam. In some examples, the first indication and the second indication are a same indication.

In some examples, the panel capability component 815 may determine that the hardware configuration of the UE does not support simultaneous communications via multiple antenna panels, and where the indication transmitted to the base station indicates that simultaneous communications using beams associated with different antenna panels is unsupported by the UE.

In some examples, the panel capability component 815 may determine a number of supported spatial layers for each antenna panel that supports simultaneous communications and a maximum number of supported spatial layers across all of the antenna panels that support simultaneous communications. In some examples, the panel capability component 815 may transmit an indication to the base station, where the indication indicates the number of supported spatial layers for each antenna panel and the maximum number supported spatial layers. In some examples, the panel capability component 815 may determine one or more combinations of spatial layers across each supported combination of antenna panels that support simultaneous communications, and a maximum number of supported spatial layers across all of the antenna panels that support simultaneous communications. In some examples, the panel capability component 815 may where the indication transmitted to the base station indicates the one or more combinations of spatial layers and the maximum number supported spatial layers.

In some cases, the indication that simultaneous communications using beams associated with different antenna panels is supported by the UE includes one or more of an indication that any beams from any set of different panels support simultaneous communications, an indication that one or more antenna panels do not support simultaneous communications, an indication of a number of panels that can support simultaneous communications and corresponding panel identifications, an indication one or more subsets of each set of beams that support simultaneous communications, or any combinations thereof.

The beamforming manager 820 may communicate with the base station using at least one of the first beam or the second beam based on the determining. In some examples, the beamforming manager 820 may transmit an indication to the base station of the two or more antenna panels and associated panel-specific operations. In some cases, the first set of beams and the second set of beams are analog millimeter-wave beams. In some cases, the determining and the transmitting are performed separately for each of two or more millimeter wave (mmW) frequency bands.

The configuration manager 825 may receive configuration information from the base station that enables simultaneous communications via multiple antenna panels.

The beam training component 830 may initiate a beam training procedure to determine beamforming parameters for the first beam and the second beam. In some examples, the beam training component 830 may initiate a beam training procedure to determine beamforming parameters for a first beam associated with a first antenna panel and a second beam associated with a second antenna panel that are to be used for simultaneous communications with the base station.

The beam identification component 835 may transmit, to the base station, a first subset of the first set of beams and a second subset of the second set of beams that can be used for simultaneous communications. In some examples, the beam identification component 835 may transmit, to the base station, an indication of the first set of beams and the second set of beams, where any beam of the first set of beams and any beam of the second set of beams can be selected for simultaneous communications. In some examples, multiple beams of the first set of beams cannot be used for simultaneous communications, and multiple beams of the second set of beams cannot be used for simultaneous communications.

The reference signal manager 840 may manage reference signals. In some cases, the reference signal resources, the reference signal ports, and the reference signal resource sets, are each associated with an SRS, a CSI-RS, a DMRS, or any combinations thereof.

In some cases, the panel identification component 810, the panel capability component 815, the beamforming manager 820, the configuration manager 825, the beam training component 830, the beam identification component 835, and the reference signal manager 840 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the panel identification component 810, the panel capability component 815, the beamforming manager 820, the configuration manager 825, the beam training component 830, the beam identification component 835, and the reference signal manager 840 discussed herein.

Figure 9:
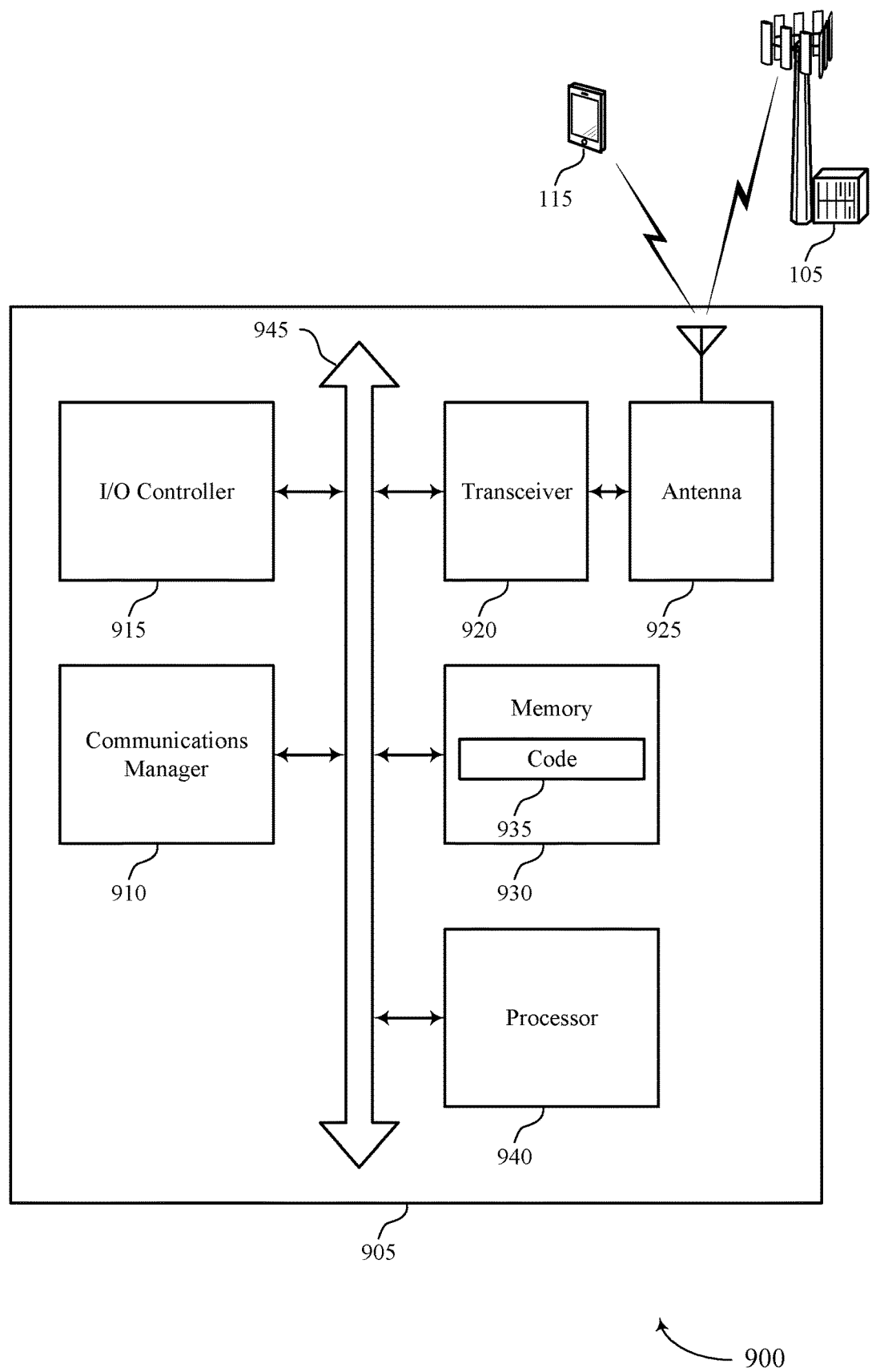
FIG. 9 shows a diagram of a system including a device that supports antenna panel capability determination and indication in wireless communications in accordance with aspects of the present disclosure.

FIG. 9 shows a diagram of a system 900 including a device 905 that supports antenna panel capability determination and indication in wireless communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify a first set of beams associated with a first antenna panel and a second set of beams associated with a second antenna panel, each beam of the first set of beams and the second set of beams having different beamforming characteristics for communications with a base station, determine whether simultaneous communications via a first beam of the first set of beams and a second beam of the second set of beams is supported, and communicate with the base station using at least one of the first beam or the second beam based on the determining.

The communications manager 910 may also identify two or more antenna panels for communications with a base station, each antenna panel of the two or more antenna panels configured to transmit a beam of an associated set of beams for communications with the base station, determine one or more panel-specific capabilities for the two or more antenna panels that are configurable for different panel-specific operations for the communications with the base station, and transmit an indication to the base station of the two or more antenna panels and associated panel-specific operations.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting antenna panel capability determination and indication in wireless communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
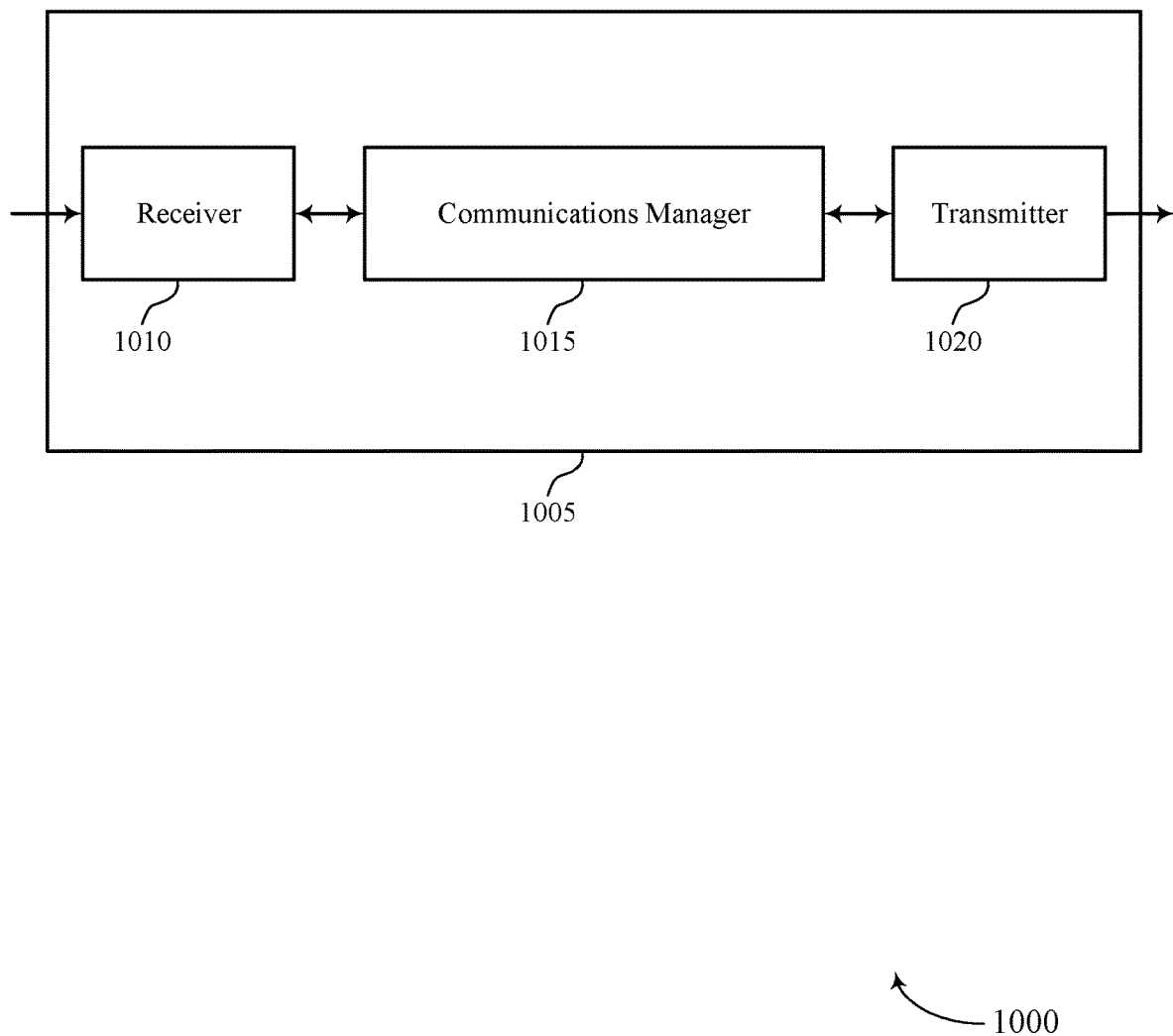
FIGS. 10 and 11 show block diagrams of devices that support antenna panel capability determination and indication in wireless communications in accordance with aspects of the present disclosure.

FIG. 10 shows a block diagram 1000 of a device 1005 that supports antenna panel capability determination and indication in wireless communications in accordance with aspects of the present disclosure. The device 1005 may be an example of aspects of a base station 105 as described herein. The device 1005 may include a receiver 1010, a communications manager 1015, and a transmitter 1020. The device 1005 may also include one or more processors, memory coupled with the one or more processors, and instructions stored in the memory that are executable by the one or more processors to enable the one or more processors to perform the antenna panel capability determination and indication features discussed herein. Each of these components may be in communication with one another (e.g., via one or more buses).

The receiver 1010 may receive information such as packets, user data, or control information associated with various information channels (e.g., control channels, data channels, and information related to antenna panel capability determination and indication in wireless communications, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a UE that is to establish communications with the base station using one or more of a first set of beams associated with a first antenna panel and a second set of beams associated with a second antenna panel, each beam of the first set of beams and the second set of beams having different beamforming characteristics for communications with the UE, communicate with the UE using at least one of the first beam or the second beam based on the determining, and determine whether simultaneous communications via a first beam of the first set of beams and a second beam of the second set of beams is supported.

The communications manager 1015 may also identify a UE that is to establish communications with the base station using two or more sets of beams associated with two or more antenna panels at the UE, establish communications with the UE via one or more beams using one or more of the antenna panels based on the panel-specific capabilities for the two or more antenna panels, receive an indication from the UE that indicates the two or more antenna panels and one or more associated panel-specific operations of each of the two or more antenna panels, and identify, based on the indication from the UE, two or more antenna panels for communications with a base station, each antenna panel of the two or more antenna panels configured to transmit a beam of an associated set of beams for communications with the base station, and one or more panel-specific capabilities for the two or more antenna panels that are configurable for different panel-specific operations for communications with the UE.

The communications manager 1015 may be an example of aspects of the communications manager 1310 described herein. The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
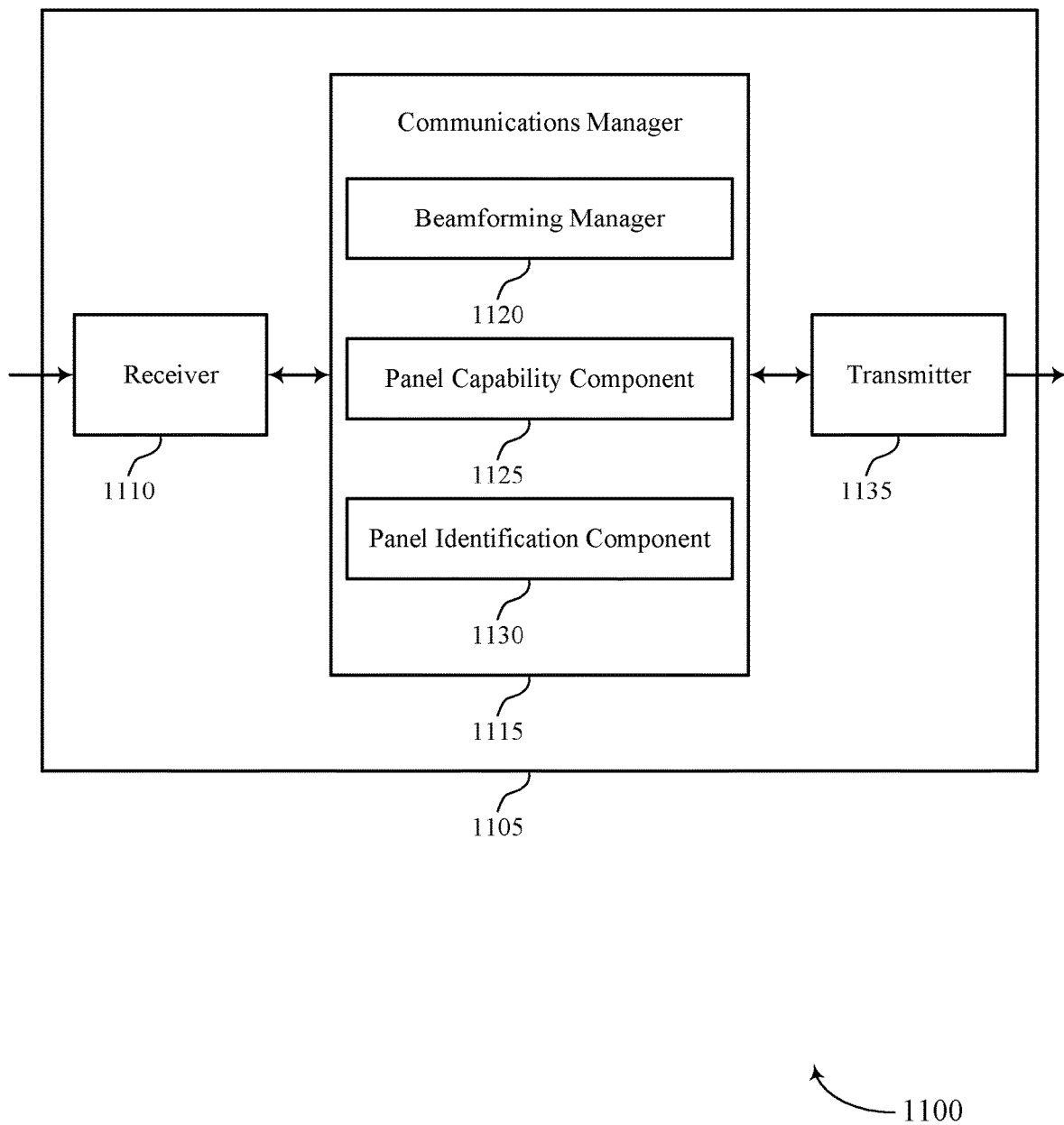

FIG. 11 shows a block diagram 1100 of a device 1105 that supports antenna panel capability determination and indication in wireless communications in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to antenna panel capability determination and indication in wireless communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a beamforming manager 1120, a panel capability component 1125, and a panel identification component 1130. The communications manager 1115 may be an example of aspects of the communications manager 1310 described herein.

The beamforming manager 1120 may identify a UE that is to establish communications with the base station using one or more of a first set of beams associated with a first antenna panel and a second set of beams associated with a second antenna panel, each beam of the first set of beams and the second set of beams having different beamforming characteristics for communications with the UE and communicate with the UE using at least one of the first beam or the second beam based on the determining.

The panel capability component 1125 may determine whether simultaneous communications via a first beam of the first set of beams and a second beam of the second set of beams is supported.

The beamforming manager 1120 may identify a UE that is to establish communications with the base station using two or more sets of beams associated with two or more antenna panels at the UE and establish communications with the UE via one or more beams using one or more of the antenna panels based on the panel-specific capabilities for the two or more antenna panels.

In some cases, the panel identification component 1130 may receive an indication from the UE that indicates the two or more antenna panels and one or more associated panel-specific operations of each of the two or more antenna panels. The panel capability component 1125 may identify, based on the indication from the UE, two or more antenna panels for communications with a base station, each antenna panel of the two or more antenna panels configured to transmit a beam of an associated set of beams for communications with the base station, and one or more panel-specific capabilities for the two or more antenna panels that are configurable for different panel-specific operations for communications with the UE.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

In some cases, the beamforming manager 1120, the panel capability component 1125, and the panel identification component 1130 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the beamforming manager 1120, the panel capability component 1125, and the panel identification component 1130 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 12:
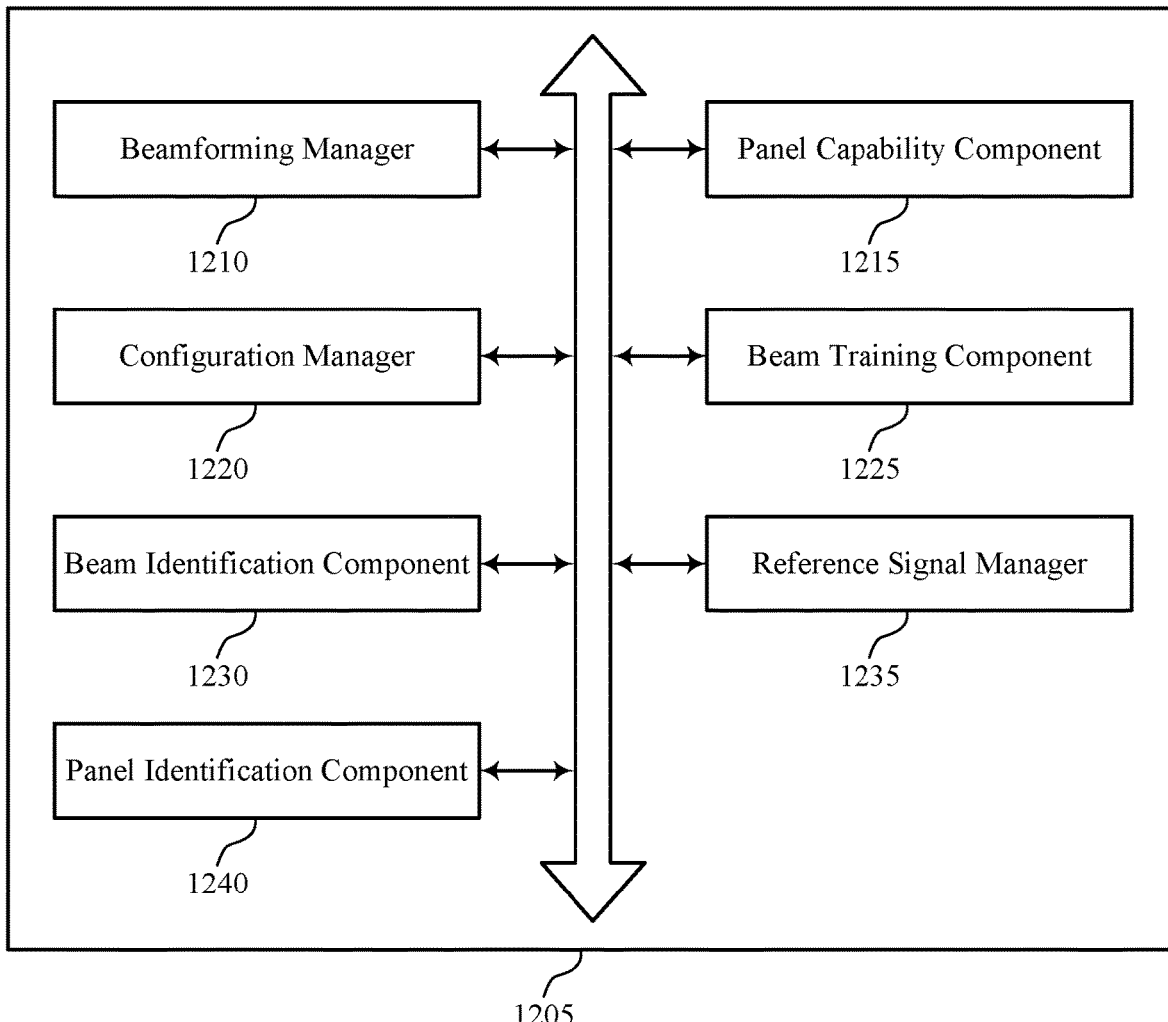
FIG. 12 shows a block diagram of a communications manager that supports antenna panel capability determination and indication in wireless communications in accordance with aspects of the present disclosure.

FIG. 12 shows a block diagram 1200 of a communications manager 1205 that supports antenna panel capability determination and indication in wireless communications in accordance with aspects of the present disclosure. The communications manager 1205 may be an example of aspects of a communications manager 1015, a communications manager 1115, or a communications manager 1310 described herein. The communications manager 1205 may include a beamforming manager 1210, a panel capability component 1215, a configuration manager 1220, a beam training component 1225, a beam identification component 1230, a reference signal manager 1235, and a panel identification component 1240. Each of these modules may communicate, directly or indirectly, with one another (e.g., via one or more buses).

The beamforming manager 1210 may identify a UE that is to establish communications with the base station using one or more of a first set of beams associated with a first antenna panel and a second set of beams associated with a second antenna panel, each beam of the first set of beams and the second set of beams having different beamforming characteristics for communications with the UE. In some examples, the beamforming manager 1210 may communicate with the UE using at least one of the first beam or the second beam based on the determining. In some examples, the beamforming manager 1210 may identify a UE that is to establish communications with the base station using two or more sets of beams associated with two or more antenna panels at the UE. In some examples, the beamforming manager 1210 may establish communications with the UE via one or more beams using one or more of the antenna panels based on the panel-specific capabilities for the two or more antenna panels.

The panel capability component 1215 may determine whether simultaneous communications via a first beam of the first set of beams and a second beam of the second set of beams is supported. In some examples, the panel capability component 1215 may identify, based on the indication from the UE, two or more antenna panels for communications with a base station, each antenna panel of the two or more antenna panels configured to transmit a beam of an associated set of beams for communications with the base station, and one or more panel-specific capabilities for the two or more antenna panels that are configurable for different panel-specific operations for communications with the UE. In some examples, the panel capability component 1215 may determine that simultaneous communications using beams associated with different antenna panels is supported or unsupported based on one or more of a hardware configuration of the UE, a predetermined rule for communications via multiple antenna panels, whether the base station has enabled simultaneous communications using beams associated with different antenna panels, or any combinations thereof.

In some examples, the panel capability component 1215 may receive an indication from the UE that the UE supports simultaneous communications via multiple antenna panels. In some examples, the panel capability component 1215 may receive, from the UE, an indication that simultaneous communications using beams associated with different antenna panels is unsupported by the UE.

In some examples, the panel capability component 1215 may configure communications with the UE using a single antenna panel. In some examples, the panel capability component 1215 may multiple beams of the first set of beams cannot be used for simultaneous communications, and multiple beams of the second set of beams cannot be used for simultaneous communications.

In some examples, the panel capability component 1215 may receive, from the UE, an indication of a maximum number of supported spatial layers for each of the first beam and the second beam based on a fixed maximum number or a hardware capability of the UE. In some examples, the panel capability component 1215 may receive an indication from the UE that simultaneous communications using beams associated with different antenna panels is supported by the UE. In some examples, the panel capability component 1215 may receive an indication from the UE that the UE does not support simultaneous communications via multiple antenna panels. In some examples, the panel capability component 1215 may receive an indication from the UE of a number of supported spatial layers for each antenna panel that supports simultaneous communications and a maximum number of supported spatial layers across all of the antenna panels that support simultaneous communications. In some examples, the panel capability component 1215 may receive an indication from the UE of one or more combinations of spatial layers across each supported combination of antenna panels that support simultaneous communications and a maximum number of supported spatial layers across all of the antenna panels that support simultaneous communications.

In some cases, the indication that simultaneous communications using beams associated with different antenna panels is supported by the UE includes one or more of an indication that any beams from any set of different panels support simultaneous communications, an indication that one or more antenna panels do not support simultaneous communications, an indication of a number of panels that can support simultaneous communications and corresponding panel identifications, an indication one or more subsets of each set of beams that support simultaneous communications, or any combinations thereof.

The panel identification component 1240 may receive an indication from the UE that indicates the two or more antenna panels and one or more associated panel-specific operations of each of the two or more antenna panels. In some examples, the panel identification component 1240 may receive an indication from the UE of one or more of a number of antenna panels, a number of beams in the associated set of beams per panel, a number of spatial layers associated with each beam or antenna panel, an indication of beam/panel combinations and corresponding spatial layers, or any combinations thereof. In some cases, each antenna panel at the UE is associated with a panel ID. In some cases, the number of beams in each set of beams correspond to a number of different reference signal resources, different reference signal resource ports, different reference signal resource sets, different spatial relations, different spatial filters, or any combinations thereof.

The configuration manager 1220 may transmit configuration information to the UE to enable simultaneous communications via multiple antenna panels.

The beam training component 1225 may initiate a beam training procedure to determine beamforming parameters for the first beam and the second beam. In some examples, the beam training component 1225 may initiate a beam training procedure to determine beamforming parameters for a first beam associated with a first antenna panel and a second beam associated with a second antenna panel that are to be used for simultaneous communications with the base station.

The beam identification component 1230 may receive, from the UE, an indication of a first subset of the first set of beams and a second subset of the second set of beams that can be used for simultaneous communications. In some examples, the beam identification component 1230 may receive, from the UE, an indication of the first set of beams and the second set of beams and that any beam of the first set of beams and any beam of the second set of beams can be selected for simultaneous communications. In some cases, the first set of beams and the second set of beams correspond to different reference signal resources, different reference signal ports, different reference signal resource sets, different spatial resources, different spatial filters, or any combinations thereof.

The reference signal manager 1235 may manage reference signals. In some cases, the reference signal resources, the reference signal ports, and the reference signal resource sets, are each associated with an SRS, a CSI-RS, a DMRS, or any combinations thereof.

In some cases, the beamforming manager 1210, the panel capability component 1215, the configuration manager 1220, the beam training component 1225, the beam identification component 1230, the reference signal manager 1235, and the panel identification component 1240 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the beamforming manager 1210, the panel capability component 1215, the configuration manager 1220, the beam training component 1225, the beam identification component 1230, the reference signal manager 1235, and the panel identification component 1240 discussed herein.

Figure 13:
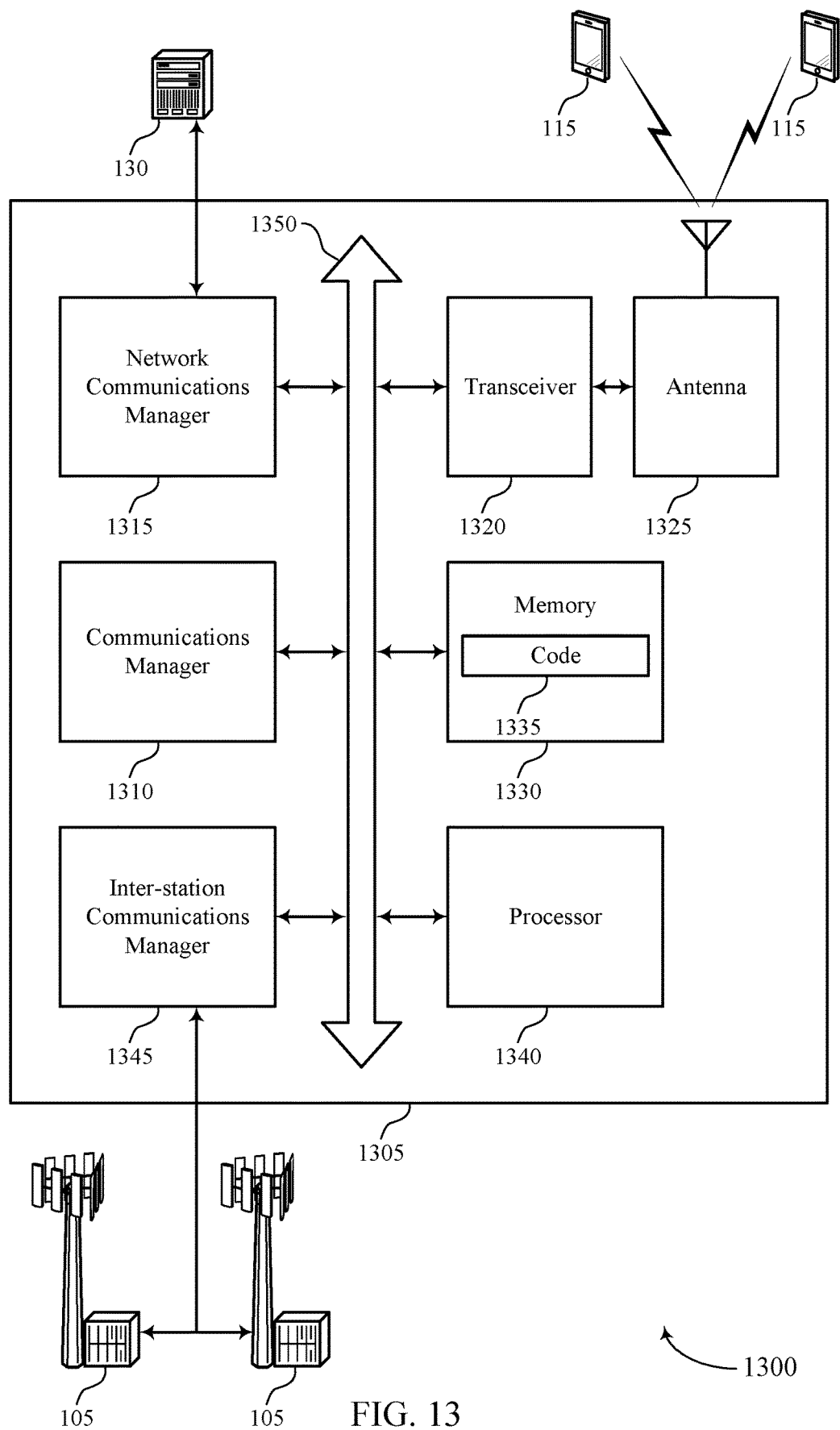
FIG. 13 shows a diagram of a system including a device that supports antenna panel capability determination and indication in wireless communications in accordance with aspects of the present disclosure.

FIG. 13 shows a diagram of a system 1300 including a device 1305 that supports antenna panel capability determination and indication in wireless communications in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify a UE that is to establish communications with the base station using one or more of a first set of beams associated with a first antenna panel and a second set of beams associated with a second antenna panel, each beam of the first set of beams and the second set of beams having different beamforming characteristics for communications with the UE, communicate with the UE using at least one of the first beam or the second beam based on the determining, and determine whether simultaneous communications via a first beam of the first set of beams and a second beam of the second set of beams is supported.

The communications manager 1310 may also identify a UE that is to establish communications with the base station using two or more sets of beams associated with two or more antenna panels at the UE, establish communications with the UE via one or more beams using one or more of the antenna panels based on the panel-specific capabilities for the two or more antenna panels, receive an indication from the UE that indicates the two or more antenna panels and one or more associated panel-specific operations of each of the two or more antenna panels, and identify, based on the indication from the UE, two or more antenna panels for communications with a base station, each antenna panel of the two or more antenna panels configured to transmit a beam of an associated set of beams for communications with the base station, and one or more panel-specific capabilities for the two or more antenna panels that are configurable for different panel-specific operations for communications with the UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting antenna panel capability determination and indication in wireless communications).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
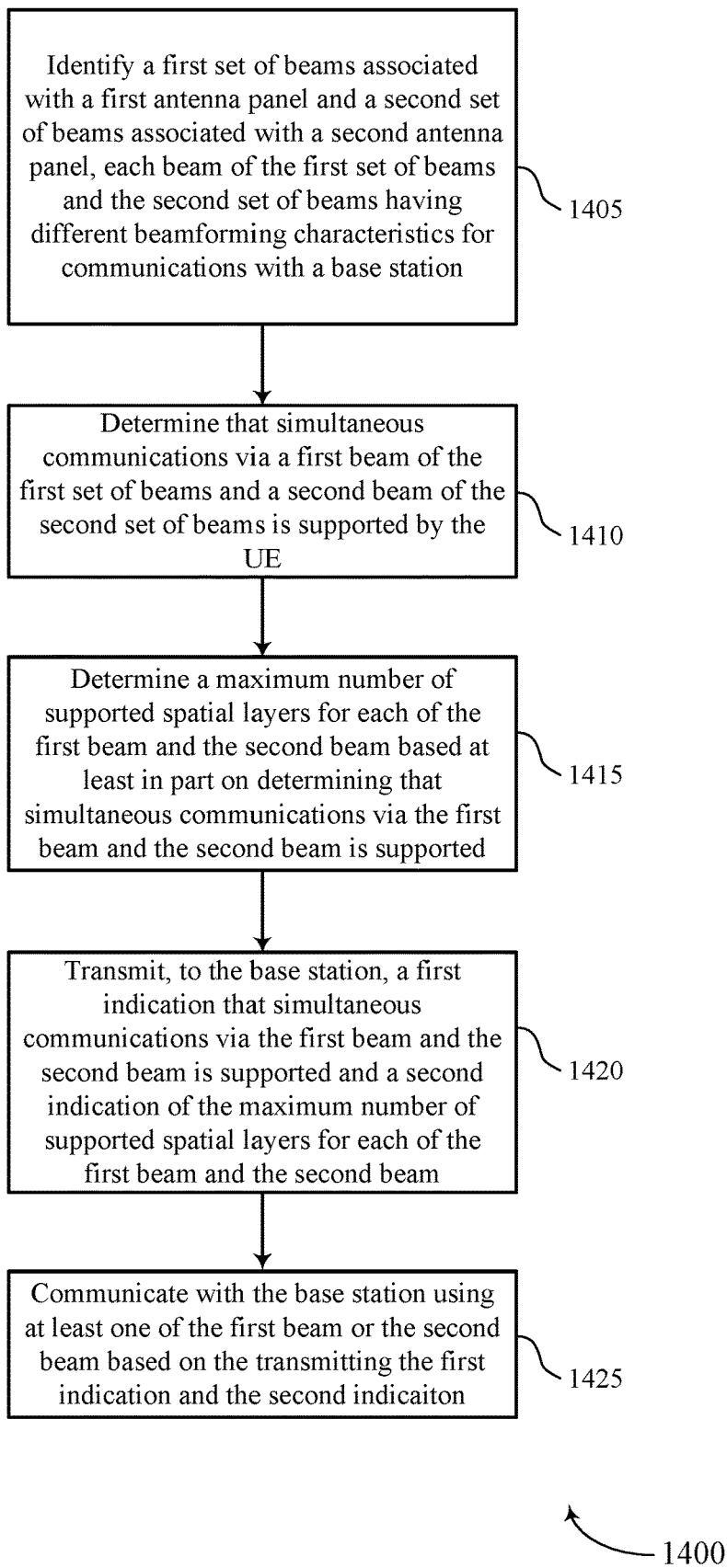
FIGS. 14 through 19 show flowcharts illustrating methods that support antenna panel capability determination and indication in wireless communications in accordance with aspects of the present disclosure.

FIG. 14 shows a flowchart illustrating a method 1400 that supports antenna panel capability determination and indication in wireless communications in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may identify a first set of beams associated with a first antenna panel and a second set of beams associated with a second antenna panel, each beam of the first set of beams and the second set of beams having different beamforming characteristics for communications with a base station. The operations of 1405 may be performed according to the methods described herein. In some examples, aspects of the operations of 1405 may be performed by a panel identification component as described with reference to FIGS. 6 through 9.

At 1410, the UE may determine that simultaneous communications via a first beam of the first set of beams and a second beam of the second set of beams is supported by the UE. The operations of 1410 may be performed according to the methods described herein. In some examples, aspects of the operations of 1410 may be performed by a panel capability component as described with reference to FIGS. 6 through 9.

At 1415, the UE may determine a maximum number of supported spatial layers for each of the first beam and the second beam based at least in part on determining that simultaneous communications via the first beam and the second beam is supported. The operations of 1415 may be performed according to the methods described herein. In some examples, aspects of the operations of 1415 may be performed by a panel capability component as described with reference to FIGS. 6 through 9.

At 1420, the UE may transmit, to the base station, a first indication that simultaneous communications via the first beam and the second beam is supported and a second indication of the maximum number of supported spatial layers for each of the first beam and the second beam. The operations of 1420 may be performed according to the methods described herein. In some examples, aspects of the operations of 1420 may be performed by a panel capability component as described with reference to FIGS. 6 through 9.

At 1425, the UE may communicate with the base station using at least one of the first beam or the second beam based on the transmitting the first indication and the second indication. The operations of 1425 may be performed according to the methods described herein. In some examples, aspects of the operations of 1425 may be performed by a beamforming manager as described with reference to FIGS. 6 through 9.

Figure 15:
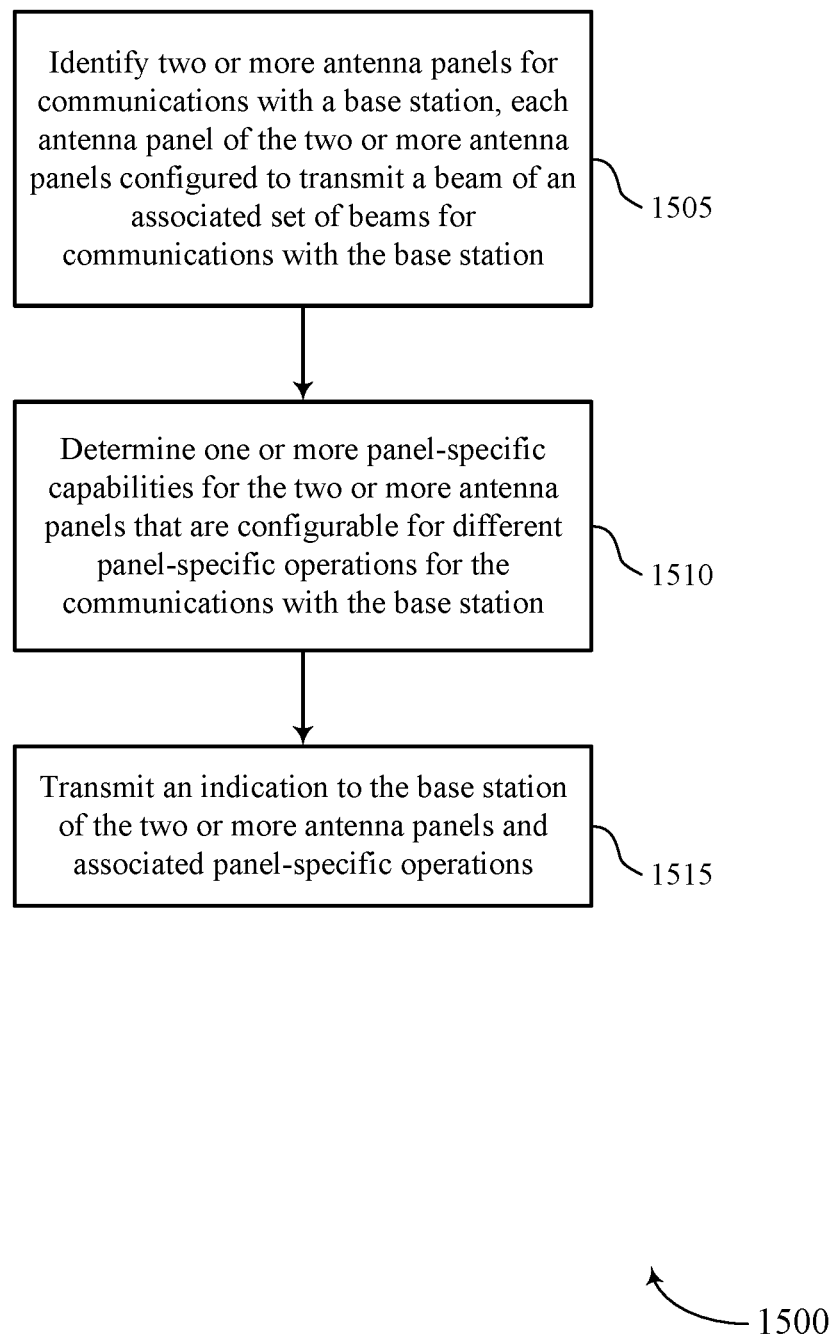

FIG. 15 shows a flowchart illustrating a method 1500 that supports antenna panel capability determination and indication in wireless communications in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may identify two or more antenna panels for communications with a base station, each antenna panel of the two or more antenna panels configured to transmit a beam of an associated set of beams for communications with the base station. The operations of 1505 may be performed according to the methods described herein. In some examples, aspects of the operations of 1505 may be performed by a panel identification component as described with reference to FIGS. 6 through 9.

At 1510, the UE may determine one or more panel-specific capabilities for the two or more antenna panels that are configurable for different panel-specific operations for the communications with the base station. The operations of 1510 may be performed according to the methods described herein. In some examples, aspects of the operations of 1510 may be performed by a panel capability component as described with reference to FIGS. 6 through 9.

At 1515, the UE may transmit an indication to the base station of the two or more antenna panels and associated panel-specific operations. The operations of 1515 may be performed according to the methods described herein. In some examples, aspects of the operations of 1515 may be performed by a beamforming manager as described with reference to FIGS. 6 through 9.

Figure 16:
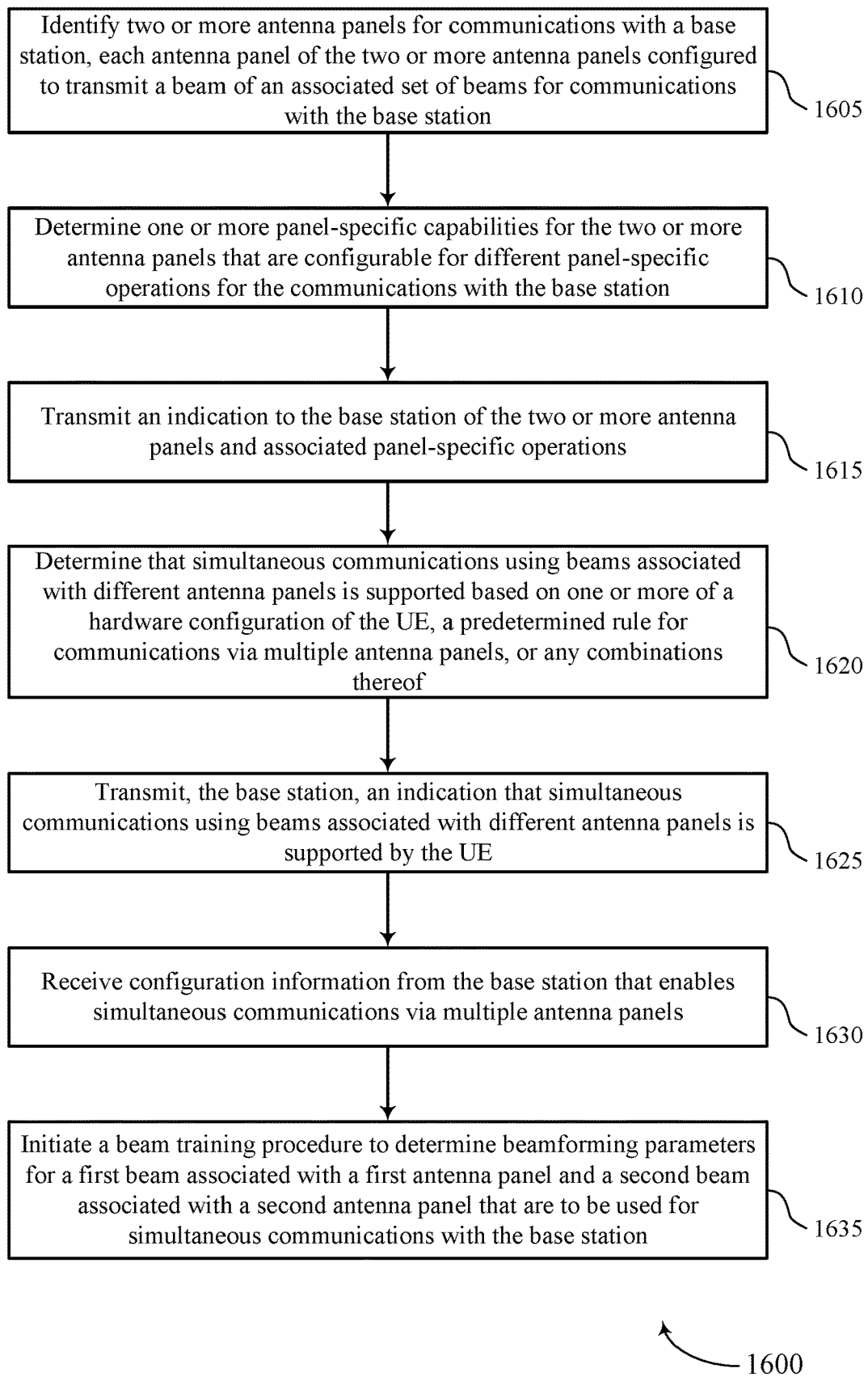

FIG. 16 shows a flowchart illustrating a method 1600 that supports antenna panel capability determination and indication in wireless communications in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may identify two or more antenna panels for communications with a base station, each antenna panel of the two or more antenna panels configured to transmit a beam of an associated set of beams for communications with the base station. The operations of 1605 may be performed according to the methods described herein. In some examples, aspects of the operations of 1605 may be performed by a panel identification component as described with reference to FIGS. 6 through 9.

At 1610, the UE may determine one or more panel-specific capabilities for the two or more antenna panels that are configurable for different panel-specific operations for the communications with the base station. The operations of 1610 may be performed according to the methods described herein. In some examples, aspects of the operations of 1610 may be performed by a panel capability component as described with reference to FIGS. 6 through 9.

At 1615, the UE may transmit an indication to the base station of the two or more antenna panels and associated panel-specific operations. The operations of 1615 may be performed according to the methods described herein. In some examples, aspects of the operations of 1615 may be performed by a beamforming manager as described with reference to FIGS. 6 through 9.

At 1620, the UE may determine that simultaneous communications using beams associated with different antenna panels is supported based on one or more of a hardware configuration of the UE, a predetermined rule for communications via multiple antenna panels, or any combinations thereof. The operations of 1620 may be performed according to the methods described herein. In some examples, aspects of the operations of 1620 may be performed by a panel capability component as described with reference to FIGS. 6 through 9.

At 1625, the UE may transmit, the base station, an indication that simultaneous communications using beams associated with different antenna panels is supported by the UE. The operations of 1625 may be performed according to the methods described herein. In some examples, aspects of the operations of 1625 may be performed by a panel capability component as described with reference to FIGS. 6 through 9.

At 1630, the UE may receive configuration information from the base station that enables simultaneous communications via multiple antenna panels. The operations of 1630 may be performed according to the methods described herein. In some examples, aspects of the operations of 1630 may be performed by a configuration manager as described with reference to FIGS. 6 through 9.

At 1635, the UE may initiate a beam training procedure to determine beamforming parameters for a first beam associated with a first antenna panel and a second beam associated with a second antenna panel that are to be used for simultaneous communications with the base station. The operations of 1635 may be performed according to the methods described herein. In some examples, aspects of the operations of 1635 may be performed by a beam training component as described with reference to FIGS. 6 through 9.

Figure 17:
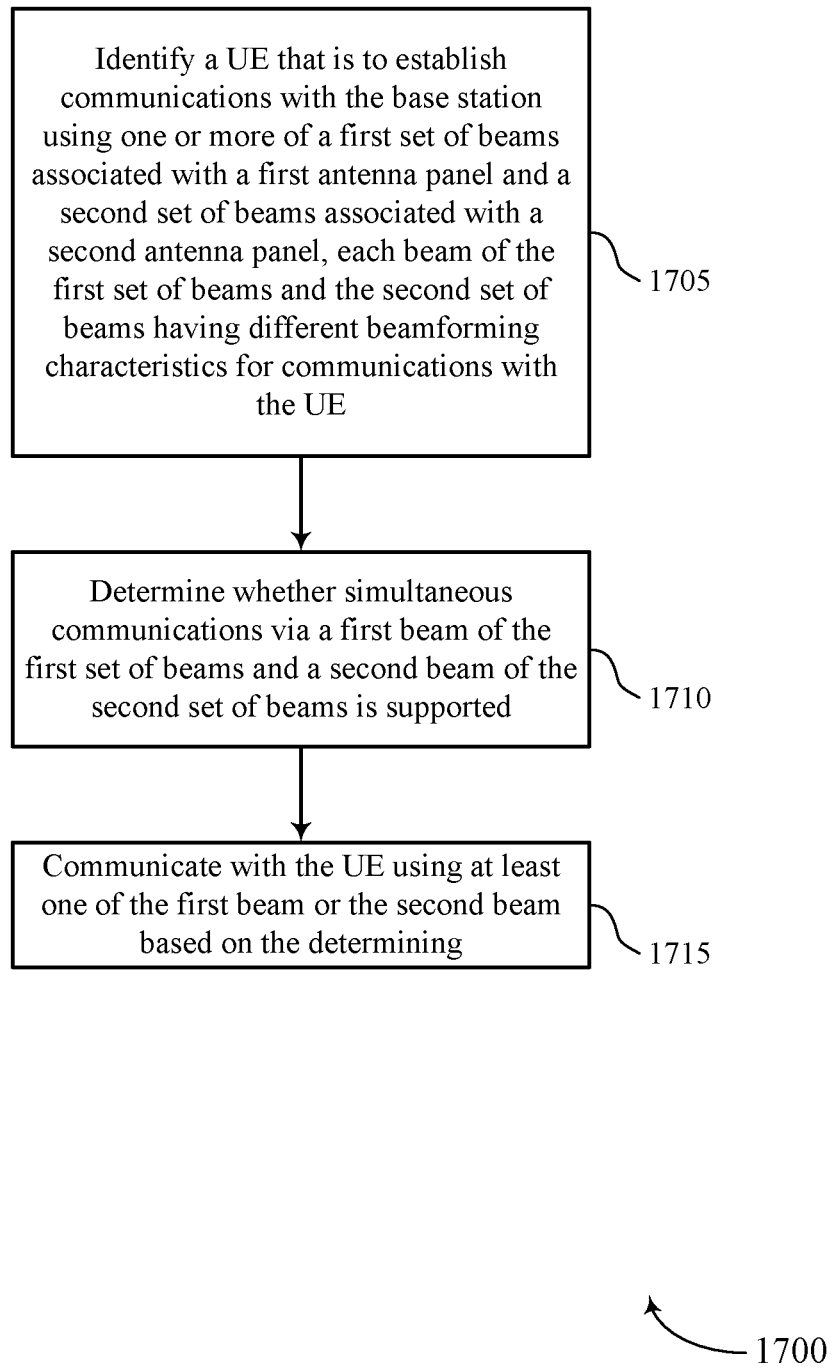

FIG. 17 shows a flowchart illustrating a method 1700 that supports antenna panel capability determination and indication in wireless communications in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1705, the base station may identify a UE that is to establish communications with the base station using one or more of a first set of beams associated with a first antenna panel and a second set of beams associated with a second antenna panel, each beam of the first set of beams and the second set of beams having different beamforming characteristics for communications with the UE. The operations of 1705 may be performed according to the methods described herein. In some examples, aspects of the operations of 1705 may be performed by a beamforming manager as described with reference to FIGS. 10 through 13.

At 1710, the base station may determine whether simultaneous communications via a first beam of the first set of beams and a second beam of the second set of beams is supported. The operations of 1710 may be performed according to the methods described herein. In some examples, aspects of the operations of 1710 may be performed by a panel capability component as described with reference to FIGS. 10 through 13.

At 1715, the base station may communicate with the UE using at least one of the first beam or the second beam based on the determining. The operations of 1715 may be performed according to the methods described herein. In some examples, aspects of the operations of 1715 may be performed by a beamforming manager as described with reference to FIGS. 10 through 13.

Figure 18:
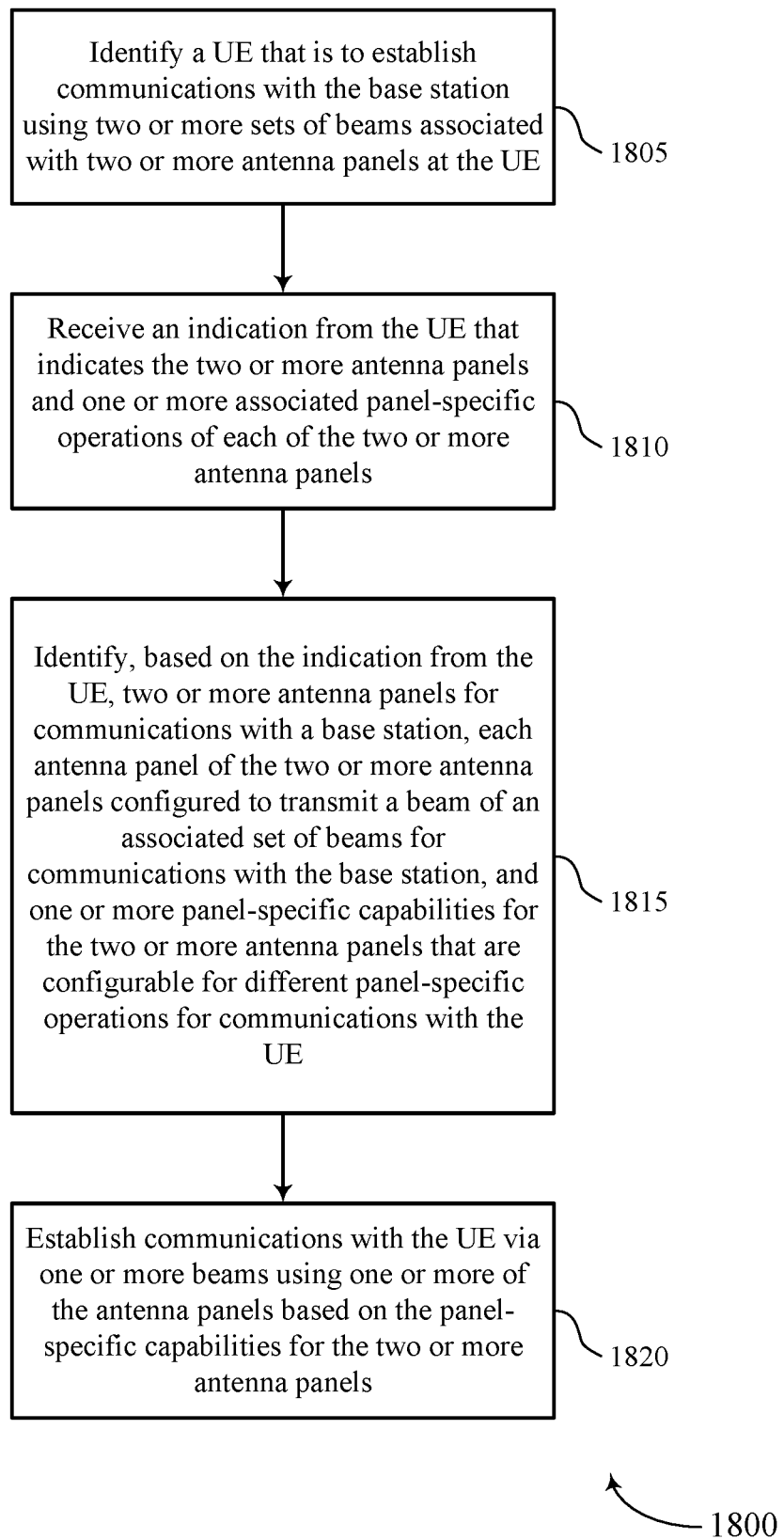

FIG. 18 shows a flowchart illustrating a method 1800 that supports antenna panel capability determination and indication in wireless communications in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may identify a UE that is to establish communications with the base station using two or more sets of beams associated with two or more antenna panels at the UE. The operations of 1805 may be performed according to the methods described herein. In some examples, aspects of the operations of 1805 may be performed by a beamforming manager as described with reference to FIGS. 10 through 13.

At 1810, the base station may receive an indication from the UE that indicates the two or more antenna panels and one or more associated panel-specific operations of each of the two or more antenna panels. The operations of 1810 may be performed according to the methods described herein. In some examples, aspects of the operations of 1810 may be performed by a panel identification component as described with reference to FIGS. 10 through 13.

At 1815, the base station may identify, based on the indication from the UE, two or more antenna panels for communications with a base station, each antenna panel of the two or more antenna panels configured to transmit a beam of an associated set of beams for communications with the base station, and one or more panel-specific capabilities for the two or more antenna panels that are configurable for different panel-specific operations for communications with the UE. The operations of 1815 may be performed according to the methods described herein. In some examples, aspects of the operations of 1815 may be performed by a panel capability component as described with reference to FIGS. 10 through 13.

At 1820, the base station may establish communications with the UE via one or more beams using one or more of the antenna panels based on the panel-specific capabilities for the two or more antenna panels. The operations of 1820 may be performed according to the methods described herein. In some examples, aspects of the operations of 1820 may be performed by a beamforming manager as described with reference to FIGS. 10 through 13.

Figure 19:
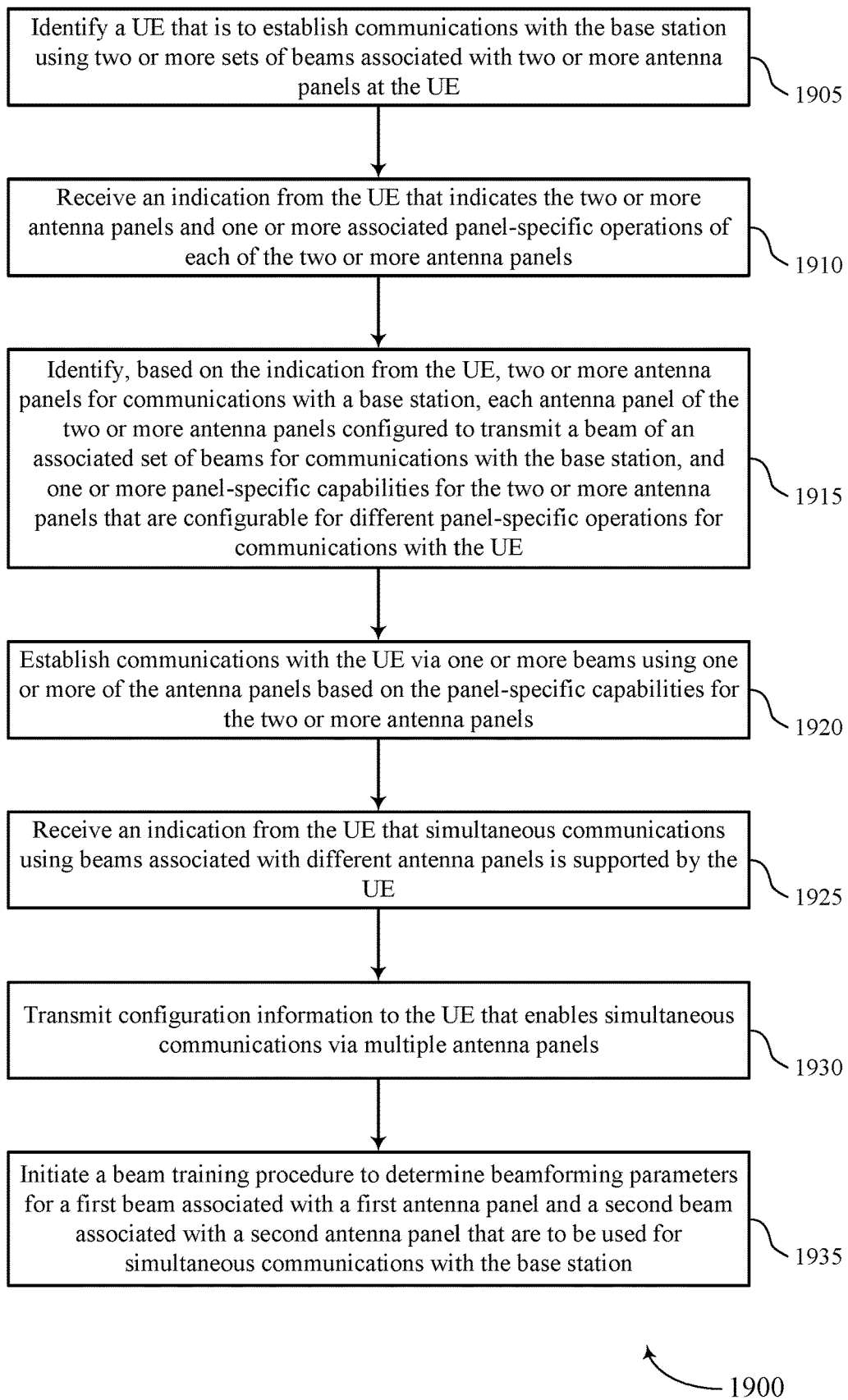

FIG. 19 shows a flowchart illustrating a method 1900 that supports antenna panel capability determination and indication in wireless communications in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1905, the base station may identify a UE that is to establish communications with the base station using two or more sets of beams associated with two or more antenna panels at the UE. The operations of 1905 may be performed according to the methods described herein. In some examples, aspects of the operations of 1905 may be performed by a beamforming manager as described with reference to FIGS. 10 through 13.

At 1910, the base station may receive an indication from the UE that indicates the two or more antenna panels and one or more associated panel-specific operations of each of the two or more antenna panels. The operations of 1910 may be performed according to the methods described herein. In some examples, aspects of the operations of 1910 may be performed by a panel identification component as described with reference to FIGS. 10 through 13.

At 1915, the base station may identify, based on the indication from the UE, two or more antenna panels for communications with a base station, each antenna panel of the two or more antenna panels configured to transmit a beam of an associated set of beams for communications with the base station, and one or more panel-specific capabilities for the two or more antenna panels that are configurable for different panel-specific operations for communications with the UE. The operations of 1915 may be performed according to the methods described herein. In some examples, aspects of the operations of 1915 may be performed by a panel capability component as described with reference to FIGS. 10 through 13.

At 1920, the base station may establish communications with the UE via one or more beams using one or more of the antenna panels based on the panel-specific capabilities for the two or more antenna panels. The operations of 1920 may be performed according to the methods described herein. In some examples, aspects of the operations of 1920 may be performed by a beamforming manager as described with reference to FIGS. 10 through 13.

At 1925, the base station may receive an indication from the UE that simultaneous communications using beams associated with different antenna panels is supported by the UE. The operations of 1925 may be performed according to the methods described herein. In some examples, aspects of the operations of 1925 may be performed by a panel capability component as described with reference to FIGS. 10 through 13.

At 1930, the base station may transmit configuration information to the UE that enables simultaneous communications via multiple antenna panels. The operations of 1930 may be performed according to the methods described herein. In some examples, aspects of the operations of 1930 may be performed by a configuration manager as described with reference to FIGS. 10 through 13.

At 1935, the base station may initiate a beam training procedure to determine beamforming parameters for a first beam associated with a first antenna panel and a second beam associated with a second antenna panel that are to be used for simultaneous communications with the base station. The operations of 1935 may be performed according to the methods described herein. In some examples, aspects of the operations of 1935 may be performed by a beam training component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project"

(3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a first set of beams associated with a first antenna panel and a second set of beams associated with a second antenna panel, each beam of the first set of beams and the second set of beams having different beamforming characteristics for communications with a base station;
    determining that simultaneous communications via a first beam of the first set of beams and a second beam of the second set of beams is supported by the UE;
    determining a maximum number of supported spatial layers for each of the first beam and the second beam based at least in part on determining that simultaneous communications via the first beam and the second beam is supported;
    transmitting, to the base station, a first indication that simultaneous communications via the first beam and the second beam is supported and a second indication of the maximum number of supported spatial layers for each of the first beam and the second beam; and
    communicating with the base station using at least one of the first beam or the second beam based at least in part on the transmitting the first indication and the second indication.

2. The method of claim 1, wherein determining that simultaneous communications via the first beam of the first set of beams and the second beam of the second set of beams is supported by the UE comprises:
    determining that simultaneous communications using beams associated with different antenna panels is supported based at least in part on one or more of a hardware configuration of the UE, a predetermined rule for communications via multiple antenna panels, a configuration provided by the base station, or any combinations thereof.

3. The method of claim 2, further comprising:
    determining that the hardware configuration of the UE supports simultaneous communications via multiple antenna panels.

4. The method of claim 3, further comprising:
    receiving configuration information from the base station that enables simultaneous communications via multiple antenna panels; and
    initiating a beam training procedure to determine beamforming parameters for the first beam and the second beam.

5. The method of claim 3, further comprising:
    transmitting, to the base station, a first subset of the first set of beams and a second subset of the second set of beams that can be used for simultaneous communications.

6. The method of claim 3, further comprising:
    transmitting, to the base station, an indication of the first set of beams and the second set of beams, wherein any beam of the first set of beams and any beam of the second set of beams can be selected for simultaneous communications.

7. The method of claim 1, wherein:
    multiple beams of the first set of beams cannot be used for simultaneous communications, and multiple beams of the second set of beams cannot be used for simultaneous communications.

8. The method of claim 7, wherein the first set of beams and the second set of beams correspond to different reference signal resources, different reference signal ports, different reference signal resource sets, different spatial resources, different spatial filters, or any combinations thereof.

9. The method of claim 8, wherein the reference signal resources, the reference signal ports, and the reference signal resource sets, are each associated with a sounding reference signal (SRS), a channel state information reference signal (CSI-RS), a demodulation reference signal (DMRS), or any combinations thereof.

10. The method of claim 1, wherein determining the maximum number of supported spatial layers for each of the first beam and the second beam is based at least in part on a fixed maximum number or a hardware capability of the UE.

11. The method of claim 1, wherein the first set of beams and the second set of beams are analog millimeter-wave beams.

12. The method of claim 1, wherein each of the first and second antenna panels at the UE is associated with a panel identification (ID).

13. The method of claim 1, wherein each panel ID is associated with a virtual antenna panel having two or more antenna elements that are co-located on a same antenna module or are located on different antenna modules.

14. The method of claim 1, wherein the first indication and the second indication are a same indication.

15. The method of claim 1, wherein the second indication of the maximum number of supported spatial layers for each of the first beam and the second beam is an indication of a maximum supported number of spatial layers per panel.

16. A method for wireless communication at a base station, comprising:
    identifying a user equipment (UE) that is to establish communications with the base station using one or more of a first set of beams associated with a first antenna panel and a second set of beams associated with a second antenna panel, each beam of the first set of beams and the second set of beams having different beamforming characteristics for communications with the UE;
    receiving, from the UE, an indication of a maximum number of supported spatial layers for each of a first beam of the first set of beams and a second beam of the second set of beams based at least in part on a fixed maximum number or a hardware capability of the UE;
    determining whether simultaneous communications via the first beam of the first set of beams and the second beam of the second set of beams is supported; and communicating with the UE using at least one of the first beam or the second beam based at least in part on the determining.

17. An apparatus for wireless communication at a user equipment (UE), comprising:
a processor;
a memory coupled with the processor; and
instructions stored in the memory and executable by the processor to cause the apparatus to:
identify a first set of beams associated with a first antenna panel and a second set of beams associated with a second antenna panel, each beam of the first set of beams and the second set of beams having different beamforming characteristics for communications with a base station;
determine that simultaneous communications via a first beam of the first set of beams and a second beam of the second set of beams is supported by the UE;
determine a maximum number of supported spatial layers for each of the first beam and the second beam based at least in part on determining that simultaneous communications via the first beam and the second beam is supported;
transmit, to the base station, a first indication that simultaneous communications via the first beam and the second beam is supported and a second indication of the maximum number of supported spatial layers for each of the first beam and the second beam; and
communicate with the base station using at least one of the first beam or the second beam based at least in part on the transmitting the first indication and the second indication.

18. The apparatus of claim 17, wherein the instructions are further executable by the processor to cause the apparatus to:
determine that simultaneous communications using beams associated with different antenna panels is supported or unsupported based at least in part on one or more of a hardware configuration of the UE, a predetermined rule for communications via multiple antenna panels, a configuration provided by the base station, or any combinations thereof.

19. The apparatus of claim 18, wherein the instructions are further executable by the processor to cause the apparatus to:
determine that the hardware configuration of the UE supports simultaneous communications via multiple antenna panels.

20. The apparatus of claim 19, wherein the instructions are further executable by the processor to cause the apparatus to:
receive configuration information from the base station that enables simultaneous communications via multiple antenna panels; and
initiate a beam training procedure to determine beamforming parameters for the first beam and the second beam.

21. The apparatus of claim 19, wherein the instructions are further executable by the processor to cause the apparatus to:
transmit, to the base station, a first subset of the first set of beams and a second subset of the second set of beams that can be used for simultaneous communications.

22. The apparatus of claim 19, wherein the instructions are further executable by the processor to cause the apparatus to:
transmit, to the base station, an indication of the first set of beams and the second set of beams, wherein any beam of the first set of beams and any beam of the second set of beams can be selected for simultaneous communications.

23. The apparatus of claim 17, wherein multiple beams of the first set of beams cannot be used for simultaneous communications, and multiple beams of the second set of beams cannot be used for simultaneous communications.

24. The apparatus of claim 23, wherein the first set of beams and the second set of beams correspond to different reference signal resources, different reference signal ports, different reference signal resource sets, different spatial resources, different spatial filters, or any combinations thereof.

25. The apparatus of claim 24, wherein the reference signal resources, the reference signal ports, and the reference signal resource sets, are each associated with a sounding reference signal (SRS), a channel state information reference signal (CSI-RS), a demodulation reference signal (DMRS), or any combinations thereof.

26. The apparatus of claim 17, wherein the instructions are further executable by the processor to cause the apparatus to:
determine the maximum number of supported spatial layers for each of the first beam and the second beam based at least in part on a fixed maximum number or a hardware capability of the UE.

27. The method of claim 17, wherein the first indication and the second indication are a same indication.

28. An apparatus for wireless communication at a base station, comprising:
a processor;
a memory coupled with the processor; and
instructions stored in the memory and executable by the processor to cause the apparatus to:
identify a user equipment (UE) that is to establish communications with the base station using one or more of a first set of beams associated with a first antenna panel and a second set of beams associated with a second antenna panel, each beam of the first set of beams and the second set of beams having different beamforming characteristics for communications with the UE;
receive, from the UE, an indication of a maximum number of supported spatial layers for each of a first beam of the first set of beams and a second beam of the second set of beams based at least in part on a fixed maximum number or a hardware capability of the UE;
determine whether simultaneous communications via the first beam of the first set of beams and the second beam of the second set of beams is supported; and
communicate with the UE using at least one of the first beam or the second beam based at least in part on the determining.

29. The apparatus of claim 28, wherein the instructions are further executable by the processor to cause the apparatus to:
determine that simultaneous communications using beams associated with different antenna panels is supported or unsupported based at least in part on one or more of a hardware configuration of the UE, a predetermined rule for communications via multiple antenna panels, whether the base station has enabled simultaneous communications using the beams associated with the different antenna panels, or any combinations thereof.

30. The apparatus of claim 29, wherein the instructions are further executable by the processor to cause the apparatus to:
  receive an indication from the UE that the UE supports simultaneous communications via multiple antenna panels.

* * * * *